US010203585B2

(12) United States Patent
Jannard et al.

(10) Patent No.: US 10,203,585 B2
(45) Date of Patent: Feb. 12, 2019

(54) FOCUS ASSIST SYSTEM AND METHOD

(71) Applicant: Red.com, LLC, Irvine, CA (US)

(72) Inventors: James H. Jannard, Las Vegas, NV (US); Peter Jarred Land, Los Angeles, CA (US); Deanan DaSilva, Hollywood, CA (US); Thomas Graeme Nattress, Acton (CA)

(73) Assignee: RED.COM, LLC, Irvine, CA (US)

( * ) Notice: Subject to any disclaimer, the term of this patent is extended or adjusted under 35 U.S.C. 154(b) by 0 days.

(21) Appl. No.: 15/872,560

(22) Filed: Jan. 16, 2018

(65) Prior Publication Data
US 2018/0143511 A1    May 24, 2018

Related U.S. Application Data

(60) Continuation of application No. 15/603,302, filed on May 23, 2017, now abandoned, which is a
(Continued)

(51) Int. Cl.
G03B 13/18 (2006.01)
G03B 17/20 (2006.01)
H04N 5/232 (2006.01)

(52) U.S. Cl.
CPC ............. *G03B 13/18* (2013.01); *G03B 17/20* (2013.01); *H04N 5/23212* (2013.01); *H04N 5/23293* (2013.01)

(58) Field of Classification Search
CPC .... G03B 13/18; G03B 17/20; H04N 5/23212; H04N 5/23293
See application file for complete search history.

(56) References Cited

U.S. PATENT DOCUMENTS 4,251,143 A    2/1981    Stemme et al.
4,300,826 A    11/1981    Aoki et al.
(Continued)

FOREIGN PATENT DOCUMENTS

AU    2007324081    2/2014
CN    101558355 A    10/2009
(Continued)

OTHER PUBLICATIONS

Canon, Digital Video Camcorder Instruction Manual, XL H1, 2005, Japan, in 157 pages.
(Continued)

*Primary Examiner* — Georgia Y Epps
*Assistant Examiner* — Don Williams
(74) *Attorney, Agent, or Firm* — Knobbe, Martens, Olson & Bear, LLP

(57) ABSTRACT

According to some aspects, a method for assisting the adjusting of a focus of an image includes providing a graphical representation of a detected image. The method can also include receiving an indication of a user selection of a region of the image and providing a magnified graphical representation of the selected image region. The method may further include providing a graphical indication of a degree of focus for at least a portion of the selected image region. The graphical indication in some instances is visually correlated with the magnified graphical representation of the selected image region. The size, shape, and/or color of the graphical indication in some instances can be correlated with the degree of focus for at least a portion of the selected image region.

20 Claims, 21 Drawing Sheets

Related U.S. Application Data continuation of application No. 13/463,767, filed on May 3, 2012, now Pat. No. 9,690,168, which is a continuation-in-part of application No. 12/479,546, filed on Jun. 5, 2009, now Pat. No. 8,274,026, which is a division of application No. 11/561,785, filed on Nov. 20, 2006, now Pat. No. 7,544,919.

(60) Provisional application No. 61/483,496, filed on May 6, 2011, provisional application No. 61/624,152, filed on Apr. 13, 2012.

(56) References Cited

U.S. PATENT DOCUMENTS

| | | |
|---|---|---|
| 4,313,657 A | 2/1982 | Tokutomi et al. |
| 4,329,032 A | 5/1982 | Aoki et al. |
| 4,341,451 A | 7/1982 | Krueger et al. |
| 4,341,953 A | 7/1982 | Sakai et al. |
| 4,344,686 A | 8/1982 | Stemme et al. |
| 4,373,791 A | 2/1983 | Araki |
| 4,443,087 A | 4/1984 | Kashihara et al. |
| 4,571,046 A | 2/1986 | Suzuki et al. |
| 4,597,659 A | 7/1986 | Suda et al. |
| 4,627,700 A | 12/1986 | Nakamura et al. |
| 4,760,385 A | 7/1988 | Jansson et al. |
| 4,794,459 A | 12/1988 | Moberg et al. |
| 4,994,843 A | 2/1991 | Kitazawa |
| 5,239,170 A | 8/1993 | Hughlett |
| 5,264,889 A | 11/1993 | Ishida et al. |
| 5,307,112 A | 4/1994 | Aoyama |
| 5,496,106 A | 3/1996 | Anderson |
| 5,528,332 A | 6/1996 | Furutsu |
| 5,563,678 A | 10/1996 | Kusaka |
| 5,659,812 A | 8/1997 | Uchiyama |
| 5,687,409 A | 11/1997 | Miyamoto |
| 5,909,598 A | 6/1999 | Kadohara |
| 6,035,054 A | 3/2000 | Odaka et al. |
| 6,584,284 B1 | 6/2003 | Odaka |
| 6,937,284 B1 | 8/2005 | Singh et al. |
| 7,324,151 B2 | 1/2008 | Onozawa |
| 7,544,919 B2 | 6/2009 | Nattress |
| 7,889,270 B2 | 2/2011 | Yamada et al. |
| 7,978,247 B2 | 7/2011 | Nakajima et al. |
| 8,274,026 B2 | 9/2012 | Nattress |
| 8,927,916 B2 | 1/2015 | Nattress |
| 2003/0174230 A1 | 9/2003 | Ide et al. |
| 2003/0174233 A1* | 9/2003 | Onozawa ............ H04N 5/23212 348/349 |
| 2004/0036792 A1 | 2/2004 | Moriya et al. |
| 2004/0046938 A1 | 3/2004 | Gero |
| 2004/0165879 A1 | 8/2004 | Sasaki et al. |
| 2004/0218086 A1 | 11/2004 | Voss et al. |
| 2005/0134719 A1 | 6/2005 | Beck |
| 2005/0219362 A1 | 10/2005 | Garoutte |
| 2005/0254812 A1 | 11/2005 | Kosaka et al. |
| 2005/0259161 A1 | 11/2005 | Lan et al. |
| 2006/0008264 A1 | 1/2006 | Yamaguchi et al. |
| 2006/0045504 A1 | 3/2006 | Zarnowski et al. |
| 2006/0055814 A1 | 3/2006 | Okawa |
| 2006/0098970 A1 | 5/2006 | Sato |
| 2007/0002143 A1 | 1/2007 | Elberbaum |
| 2007/0126907 A1* | 6/2007 | Stueckler ............ G03B 13/02 348/333.01 |
| 2007/0264005 A1 | 11/2007 | Haubmann |
| 2008/0074531 A1 | 3/2008 | Ide et al. |
| 2008/0116353 A1 | 5/2008 | Nattress |
| 2008/0251733 A1 | 10/2008 | Anderton |
| 2009/0009531 A1 | 1/2009 | Sudo et al. |
| 2009/0109310 A1 | 4/2009 | Kobayashi et al. |
| 2009/0245677 A1 | 10/2009 | Nattress |
| 2011/0019058 A1 | 1/2011 | Sakai et al. |
| 2011/0096220 A1 | 4/2011 | Matsumoto |
| 2012/0314116 A1 | 12/2012 | Jannard et al. |
| 2013/0177254 A1 | 7/2013 | Nattress |
| 2015/0215519 A1 | 7/2015 | Nattress |

FOREIGN PATENT DOCUMENTS

| | | |
|---|---|---|
| EP | 1 954 031 A1 | 8/2008 |
| EP | 2 031 866 | 3/2009 |
| EP | 2 100 188 | 8/2012 |
| EP | 2697963 | 2/2014 |
| HK | 1137518 | 2/2013 |
| JP | 2003-011884 | 1/1991 |
| JP | 05-127243 | 5/1993 |
| JP | 05-127244 | 5/1993 |
| JP | 11-298791 | 10/1999 |
| JP | 2002-209135 | 7/2002 |
| JP | 2003-140024 | 5/2003 |
| JP | 2003-153043 | 5/2003 |
| JP | 2004-072297 | 3/2004 |
| JP | 2004-242009 | 8/2004 |
| JP | 2005-345590 | 12/2005 |
| JP | 2006-108973 | 4/2006 |
| JP | 2006-140594 | 6/2006 |
| JP | 2007-206672 | 8/2007 |
| JP | 2008-072696 | 3/2008 |
| JP | 2008-113466 | 5/2008 |
| JP | 2008-292622 | 12/2008 |
| JP | 2009-111487 | 5/2009 |
| JP | 2010-016798 | 1/2010 |
| JP | 5099529 | 10/2012 |
| JP | 2014-519052 | 8/2014 |
| KR | 10-1417169 | 7/2014 |
| MX | 286949 | 5/2011 |
| RU | 2466438 | 11/2012 |
| SG | 152599 | 11/2011 |
| TW | I416943 | 11/2013 |
| WO | WO 2008/063811 | 5/2008 |
| WO | WO 2012/15485 | 11/2012 |

OTHER PUBLICATIONS

Canon, HD Video Camera Recorder Instruction Manual, XH G1/XH A1, 2006, Japan, in 164 pages.

European Communication received from European Patent Office in related Application No. EP07844578.0, in 5 pages, dated Mar. 31, 2011.

Examination Report Received in related Application No. NZ577055, in 2 pages, dated Dec. 20, 2010.

http://pro.jvc.com/prof/attributes/tech_desc/jsp?model_id=MDL101642&feature_id=02, 2 pages.

http://pro.jvc.com/prof/attributes/tech_desc/jsp?model_id=MDL101623&feature_id=02, 3 pages.

International Search Report and Written Opinion for PCT Application No. PCT/US2012/036602, dated Jul. 18, 2012.

International Search Report for PCT Application No. PCT/US2007/082434, dated May 6, 2008.

JVC, HD Camera Recorder, GY-HD100, GY-HD101, HDV Mini DV Instructions, LWT0278-001A-H, 2005 Victor Company of Japan, Limited.

JVC, JVC HDV Camcorder GY-HD100 Technical Report, 7 pages.

Katz, A.A., The White Paper, "Chapter 12: Extending Your Reach: Close-up and Macro," 2005, available at http://www.aakatz.com/whitepaper/part12.htm, in 40 pages.

Office Action in Russian Application No. 2009119259/28 (026524) dated Sep. 8, 2011.

Office Action received in related Chinese Application No. 200780042981.4 in 5 pages, dated Dec. 11, 2012.

Patent Modified Examination Report No. 1 received in related Australian Application No. 2007324081 JP2009 in 3 pages, dated Dec. 6, 2012.

Rejection Decision received in related Chinese Application No. 200780042981.4 in 5 pages, dated Jul. 3, 2013.

Sony, Cyber-shot, Digital Still Camera User's Guide/Troubleshooting, DSC-H2/H5, 2006, Japan, in 123 pages.

Sony, Digital Video Camera Recorder, HVR-A1N/A1P, 2005, Hong Kong, in 10 pages.

Translation of Examination Report received in New Zealand Application No. 577055 in 2 pages dated Dec. 20, 2010.

(56) References Cited

OTHER PUBLICATIONS

Translation of Office Action received in related Application No. CN200780042981.4, in 6 pages, dated Aug. 26, 2010.
Translation of Office Action received in related Application No. CN200780042981.4, in 6 pages, dated Mar. 7, 2012.
Translation of Office Action received in related Application No. JP2009-537260, in 3 pages, dated May 11, 2011.
Translation of Office Action received in related Application No. JP2009-537260, in 6 pages dated Feb. 14, 2012.
Translation of Office Action received in related Korean Application No. 10-2009-7011999 in 10 pages dated Jun. 18, 2013.
Translation of Office Action received in related Taiwan Application No. 096141532, in 14 pages, dated May 28, 2013.
Written Opinion issued from Australian Patent Office in related Application No. SG200903348-1, in 6 pages, dated Apr. 7, 2010.
Written Opinion received in related Singapore Application No. SG 200903348-1 in 7 pages dated May 19, 2010.
Yenra, Sony HDV Camcorder, Sep. 7, 2004, in 2 pages.
Office Action in related Canadian Application No. 2669580 dated Jan. 27, 2014.
Office Action in related Canadian Application No. 2669580, in 3 pages, dated Feb. 26, 2015.
Office Action in related European Application No. 12 720 762.9, in 6 pages, dated Nov. 11, 2014.
Office Action in related European Application No. 12 720 762.9, in 6 pages, dated Nov. 19, 2015.
Office Action in related Japanese Application No. 2014-509495 in 8 pages, dated Dec. 25, 2015.
Notice of Allowance in Canadian Application No. 2,669,580 dated Feb. 4, 2016 in 1 page.
Office Action in related Japanese Application No. 2014-509495 in 8 pages, dated Sep. 6, 2016.
Decision to Grant in related Japanese Application No. 2014-509495 in 5 pages, dated Feb. 1, 2017.
Nattress, U.S. Appl. No. 11/561,785, now U.S. Pat. No. 7,544,919, filed Nov. 20, 2006, Focus Assist System and Method.
Nattress, U.S. Appl. No. 12/479,546, now U.S. Pat. No. 8,274,026, filed Jun. 5, 2009, Focus Assist System and Method.
Nattress, U.S. Appl. No. 13/624,738, now U.S. Pat. No. 8,927,916, filed Sep. 21, 2012, Focus Assist System and Method.
Nattress, U.S. Appl. No. 14/561,059, now U.S. Pat. No. 9,692,958, filed Dec. 4, 2014, Focus Assist System and Method.
Jannard, U.S. Appl. No. 13/463,767, now U.S. Pat. No. 9,690,168, filed May 3, 2012, Focus Assist System and Method.
Jannard, U.S. Appl. No. 15/603,302, filed May 23, 2017, Focus Assist System and Method.

\* cited by examiner

FOCUS ASSIST SYSTEM AND METHOD

PRIORITY INFORMATION

This application is a continuation of U.S. application Ser. No. 15/603,302, filed May 23, 2017, which is a continuation of U.S. application Ser. No. 13/463,767, filed May 3, 2012, issued as U.S. Pat. No. 9,690,168, which claims priority benefit from U.S. provisional application Nos. 61/483,496 and 61/624,152, filed May 6, 2011 and Apr. 13, 2012, respectively, and is a continuation-in-part of U.S. application Ser. No. 12/479,546, filed Jun. 5, 2009, issued as U.S. Pat. No. 8,274,026, which is a divisional of U.S. application Ser. No. 11/561,785, filed Nov. 20, 2006, issued as U.S. Pat. No. 7,544,919. The entirety of each of the foregoing applications are hereby incorporated by reference.

BACKGROUND

The invention relates to providing focus information. There are two basic methods of focusing a camera or optical instrument.

In an autofocus system, the camera sets the focus level with little or no user input. The camera collects data about the relative focus level of objects in the camera lens. It uses an algorithm to interpret that data and set an optimum focus level. However, this algorithm does not necessarily execute the photographer's intentions. Many autofocus algorithms prioritize objects that are close to the center of the frame or that are brightly lit. If the object of the photographer's interest is off-center or dimly lit, the autofocus algorithm may calibrate a focus level based on objects in which the photographer has no interest.

Manual focus cameras require more effort from the user. But, they also give the photographer more control over the focus level. Because manual focus cameras are more responsive to the user's wishes and potentially more precise, professionals often use manual focus cameras.

Whichever system a camera employs—autofocus or manual focus—the ability of the system to yield desirable results depends on the user's ability to confirm which objects are in or out of focus. In an autofocus system, if it is unclear which objects are in or out of focus, the user cannot confirm that the autofocus algorithm has identified the user's primary objects of interest and set the focus level accordingly. In a manual focus system, if a user cannot confirm which objects are in or out of focus, the user cannot confirm the precision of focus adjustments.

Camera displays may be too small or imprecise to reliably convey to the user whether or not an object is in focus, or if out of focus, just how much out of focus. They do not often allow the user to distinguish between gradations in the focus level or balance the focus level between multiple objects in the viewfinder.

SUMMARY

An optical lens having a variable focal length is used to detect an image. The lens focuses the image on a sensor, and the sensor captures information corresponding to individual picture elements (pixels). A display shows the detected image.

In order to assist a user to adjust the focus of the image, a waveform indicates a degree of focus. The waveform may be superimposed on the image, or may be displayed adjacent to the image. Alternatively, the waveform may be displayed on a separate screen. The waveform is updated in real-time, allowing the user to adjust the focus contemporaneously. The display of the degree of focus could be used, e.g., for still cameras and motion picture cameras.

The optical sensor converts the image from the lens into a two-dimensional, digital array of pixels, with the array of pixels arranged in rows and columns. In one embodiment, a processor operates on a row of pixels to determine focus level data for a plurality of pixels in that row.

The waveform may indicate the degree of focus through color variations, intensity variations, density variations, amplitude variations, or other visual indicia. A combination of different types of indicia may be used.

The focus level data may be determined, for example, with an edge detection algorithm. In one embodiment, the focus level data is determined by comparing at least a portion of the digital array of pixels with a blurred rendition of the same portion of the array.

In one embodiment, an image is detected using a two-dimensional array of optical sensors. The detected image is converted into a data structure that represents the detected image as a two-dimensional array of pixel values, where the pixel values are representative of an amount of light detected by the optical sensors. A blurred image is generated by combining a selected pixel value with a plurality of pixel values from the vicinity of the selected pixel value. The degree of focus is then determined by comparing the selected pixel value with a corresponding blurred image pixel value. A visual indication of the degree of focus is then provided. In one embodiment, the visual indication of the degree of focus may be overlaid on a representation of the detected image. In another embodiment, the visual indication of the degree of focus is adjacent to a representation of the detected image. Providing the visual indication of the degree of focus may comprise displaying a waveform corresponding to the degree of focus. A point on the waveform may correspond to an average degree of focus for a plurality of vertically aligned pixels. In another embodiment, a point on the waveform may correspond to an average degree of focus for a plurality of horizontally aligned pixels. In yet another embodiment, a point on the waveform may correspond to an average degree of focus for a plurality of pixels in a block. In a further embodiment, a point on the waveform corresponds to an average degree of focus for a plurality of non-adjacent pixels.

In one embodiment, a method of providing feedback to allow focusing an image in real time comprises using a programmed algorithm to determine a degree of focus of a plurality of regions and providing a visual indication of the degree of focus of each region. The visual indication may take a variety of formats, such as, for example, a waveform, varying the relief of a region, or indication of focus by a geometric figure. The region may be, for example, a line or a regular geometric pattern. In one embodiment, the degree of focus of a region may indicated by varying the color of the region. In another embodiment, the degree of focus of a region may be indicated by varying the brightness of the region. The regions may be described by edge detection, and the degree of focus of each region may be indicated by varying, e.g., the brightness or color of an edge.

According to further aspects, a method for assisting the adjusting of a focus of an image includes providing a graphical representation of a detected image. The method can also include receiving an indication of a user selection of a region of the image and providing a magnified graphical representation of the selected image region. The method may further include providing a graphical indication of a degree of focus for at least a portion of the selected image region. The graphical indication in some instances is visually correlated with the magnified graphical representation of the selected image region.

According to further aspects, a method for assisting the adjusting of a focus of an image includes detecting an image and providing a graphical representation of the image. The method further includes receiving an indication of a user selection of a first portion of the image. The method can also include applying an algorithm operating on one or more processors to determine focus levels for one or more regions of the first portion of the image. In response to the user selection, the method can include providing a visual indication of the focus levels.

In some additional embodiments, an apparatus assists in adjusting a focus of an image. The apparatus can include a lens having variable focal length. The lens produces a visual data image from light that enters the lens. The apparatus can also include a manual focus adjustment that adjusts the focal length of the lens and an optical sensor that converts the visual data image from the lens into a digital representation of the image. The apparatus may further include a display configured to show a graphical representation of the image. The apparatus can also include an interface configured to receive a user selection of a first portion of the image. In some instances, the apparatus further includes one or more processors configured to process the digital representation of the image to determine focus levels for one or more regions of the first portion. Additionally, the display can provide a visual indication of the focus levels.

In some embodiments, a visual indication of a degree of focus of a region of an image is provided. In some embodiments, the visual indication of the degree of focus of the region or all or part of the image may be overlaid on a representation of the detected image. The visual indication can be overlaid on the representation of the detected image so that the center of the visual indication coincides with the center of the region of the image for which the degree of focus is visually indicated. The visual indication can be configured to change size, shape, and/or color in response to changes in the degree of focus. In some implementations, the visual indication decreases in size corresponding to an increase in the degree of focus of the region of the image. The visual indication can change color in response to changes in degrees of focus. The visual indication can change shape in response to changes in degrees of focus. The region of the image can be selected by a user. In some embodiments, a second visual indication can be overlaid on the representation of the detected image. The second visual indication can be configured to change color corresponding to changes in the degree of focus. The size of the second visual indication can correspond to the size of the region of the image for which the degree of focus is visually indicated. In some embodiments, multiple regions can be selected and corresponding visual indicators can be provided overlaid on the representation of the detected image. Although described with respect to particular example visual indications, other forms of visual indications are compatible with the techniques described herein.

In some embodiments, a method for indicating a focus of a region of an image is provided. The method includes determining a degree of focus for a region of the image and providing a visual indication of the degree of focus. In response to a change in the degree of focus, the size of the visual indication can be changed, wherein the size of the visual indication is correlated to the degree of focus.

In some embodiments, the size of the visual indication transitions from a first size to a second size based on a change from a first degree of focus to a second degree of focus. The transition can include adjusting the size of the visual indication to one or more intermediate sizes during the transition from the first size to the second size, the intermediate sizes being between the first size and the second size and corresponding to intermediate focus levels between the first degree of focus and the second degree of focus.

In some embodiments, a degree of focus for a second region of the image is determined. A second visual indication of the degree of focus for the second region can be provided wherein the size of the second visual indication changes in response to a change in the degree of focus for the second region, wherein the size of the second visual indication is correlated to a current degree of focus.

In some embodiments, an apparatus that assists in adjusting a focus of an image is provided. The apparatus can include an image sensor for detecting an image and one or more processors for determining a degree of focus for a region of the image. The apparatus can also include a display configured to show a graphical representation of the detected image and to show a visual indication of the degree of focus of the region, the visual indication having a size that is correlated to the degree of focus of the region.

In some embodiments, a method for assisting the adjusting of a focus of an image is provided. The method can include detecting an image using at least one imaging sensor and providing a graphical representation of the image on a display. The method can further include receiving an indication of a user selection of a first portion of the displayed image and providing a magnified view of the first portion on the display. The method can include applying an algorithm operating on one or more processors to determine a degree of focus for at least two regions within the first portion. The method further includes providing a visual indication of the degree of focus for each of the at least two regions.

Some embodiments provide for a method for visually indicating a degree of focus for a region of an image. The method can include detecting an image using at least one imaging sensor, providing a graphical representation of the image on a display, and applying an algorithm operating on one or more processors to determine a degree of focus for a region of the image. The method can further include providing a visual indication of the degree of focus on the display, wherein the visual indication includes a geometric figure that at least partially overlaps with the region on the graphical representation of the image. The method can set the visual indication to a first size corresponding to a first degree of focus. Furthermore, in response to an adjustment of focus and to a corresponding change in the determined degree of focus from the first degree of focus to a second degree of focus higher than the first degree of focus, the method can include changing the visual indication to a second size that is smaller than the first size. In some embodiments, the method can include determining a degree of focus for a second region of the image and providing a second visual indication of the degree of focus for the second region on the display, the second visual indication comprising a geometric figure. In some embodiments, the method can include setting the second visual indication to a first size corresponding to a first degree of focus for the second region. Moreover, in response to an adjustment of focus and to a corresponding change in the determined degree of focus for the second region from the first degree of focus for the second region to a second degree of focus for the second region higher than the first degree of focus, the method can include changing the second visual indication to a second size that is smaller than the first size.

In some embodiments, an apparatus that assists in adjusting a focus of an image is provided. The apparatus can include at least one image sensor configured to detect an image and one or more processors configured to execute an algorithm to determine a degree of focus for a region of the image. The apparatus can include a display configured to show a graphical representation of the image and to show a visual indication of the degree of focus of the region, the visual indication comprising a geometric figure. In some embodiments, a size of the visual indication is correlated to the degree of focus of the region such that a first size of the visual indication corresponds to a first degree of focus of the region and a second size of the visual indication smaller than the first size corresponds to a second degree of focus of the region higher than the first degree of focus.

In some embodiments, a method for assisting the adjusting of a focus of an image is provided. The method can include detecting an image, providing a graphical representation of the image, and receiving an indication of a selection of a first portion of the image. Based in part on the selection of the first portion of the image, the method can include applying an algorithm operating on one or more processors to determine a plurality of focus level values for the first portion of the image. The method can further include providing a magnified graphical representation of the first portion of the image in response to the selection of the first portion of the image, and providing a visual indication of the plurality of focus level values.

In one embodiment, the method can include superimposing the magnified graphical representation and the visual indication on the graphical representation of the image. In one embodiment, the visual indication comprises at least one waveform. In certain embodiments, the graphical representation, the magnified graphical representation, and the visual indication are presented on a display of a motion picture camera. In some embodiments, the focus level values for the first portion of the image are indicated by varying a relief of the first portion of the image. In one embodiment, the selection of the first portion of the image is received through a user interface, such as a touch screen. The method can further include calculating a degree of focus corresponding to an average of at least two of the plurality of focus level values. In one embodiment, a size of the visual indication corresponds to the degree of focus. The method can include changing the size of the visual indication in response to a change in the degree of focus, e.g. the size of the visual indication can decrease in response to an increase in the degree of focus. In some embodiments, the visual indication is a circle.

According to further aspects, the method can include superimposing the visual indication on the graphical representation of the image. The center of the visual indication can substantially coincide with the center of the first portion of the image when superimposed on the graphical representation of the image. In one embodiment, the color of the visual indication can correspond to the degree of focus. In such an embodiment, the method can include changing the color of the visual indication in response to a change in the degree of focus. For example, the color of the visual indication can be green when the degree of focus corresponds to a relatively high degree of focus, the color of the visual indication can be red when the degree of focus corresponds to a relatively low degree of focus, and the color of the visual indication can be yellow when the degree of focus corresponds to an intermediate degree of focus. As another example, the color of the visual indication can be green when the degree of focus is greater than an upper threshold, the color of the visual indication can be red when the degree of focus is less than a lower threshold, and the color of the visual indication can be yellow when the degree of focus is greater than or equal to the lower threshold and less than or equal to the upper threshold.

According to further aspects, the method can include receiving a second indication of a second portion of an image, determining a plurality of focus level values for the second portion of the image, and providing a second magnified graphical representation of the second portion of the image in response to the selection of the second portion of the image. The method can further include providing a second visual indication of the plurality of focus level values for the second portion of the image. In one embodiment, the magnified graphical representation, the second magnified graphical representation, the visual indication, and the second visual indication are superimposed on the graphical representation of the image.

In some embodiments, the algorithm to determine the degree of focus is applied before receiving the indication of the selection of the first portion of the image. In some embodiments, the algorithm is applied after receiving the indication of the selection of the first portion of the image. In certain embodiments, before receiving the indication of the selection of the portion of the image, the method includes applying the algorithm to determine the plurality of focus level values for one or more regions of the first portion of the image as well as for one or more regions that are not in the first portion of the image. The method can then include providing a visual indication of the plurality of focus level values for the one or more regions of the first portion and for the one or more regions that are not in the first portion. In certain implementations, the first portion of the image is described by a regular geometric pattern.

Some embodiments provide for an apparatus that assists in adjusting a focus of an image. The apparatus can include a lens having a variable focal length, a focus adjustment that, in use, adjusts the focal length of the lens, and an image sensor that, in use, converts the visual data image from the lens into a digital representation of the image. The apparatus can further include an electronic display that, in use, shows a graphical representation of the image, an interface that, in use, receives a user selection of a first portion of the image, and one or more processors configured to process the digital representation of the image to determine a plurality of focus level values for one or more regions of the first portion. The electronic display can provide a magnified graphical representation of the first portion of the image in response to the user selection, and the electronic display can provide a visual indication of the plurality of focus level values. Some embodiments provide for a motion picture camera incorporating the apparatus.

In further aspects, the interface can be a touch screen interface. The electronic display can, in use, display the visual indication and the magnified graphical representation superimposed on the graphical representation. The apparatus can further include one or more processors that, in use, calculate a degree of focus corresponding to an average of at least two of the plurality of focus level values for the one or more regions of the first portion of the image. In one embodiment, a size of the visual indication corresponds to the degree of focus. In certain embodiments, the apparatus updates the degree of focus calculation in real-time and changes the size of the visual indication in response to the updated degree of focus calculation. In some embodiments, the size of the visual indication decreases in response to an increase in the degree of focus.

BRIEF DESCRIPTION OF THE DRAWINGS

These and other features will now be described with reference to the drawings summarized below. These drawings and the associated description are provided to illustrate a preferred embodiment of the invention, and not to limit the scope of the invention.

DETAILED DESCRIPTION

The following description of different implementations has been presented by way of example only, and should not be read in a limiting sense. The scope of the present invention is defined only by the claims.

In one embodiment, a camera displays focus level data to a user. The focus level data may be superimposed on the primary viewfinder screen, or it may be displayed on a secondary screen. Various optical imaging systems—such as the motion picture camera or the photo camera—might generate and display focus level data. However, the invention is not limited to cameras. Any optical imaging system can display focus level information to the user. Examples include light microscopes, telescopes, or binoculars. Similarly, non-optical instruments that produce an image can also display focus level information to the user. An example is an electron microscope. Further, an algorithm can generate and display focus level data to the user for images or videos after they have been recorded.

Figure 1:
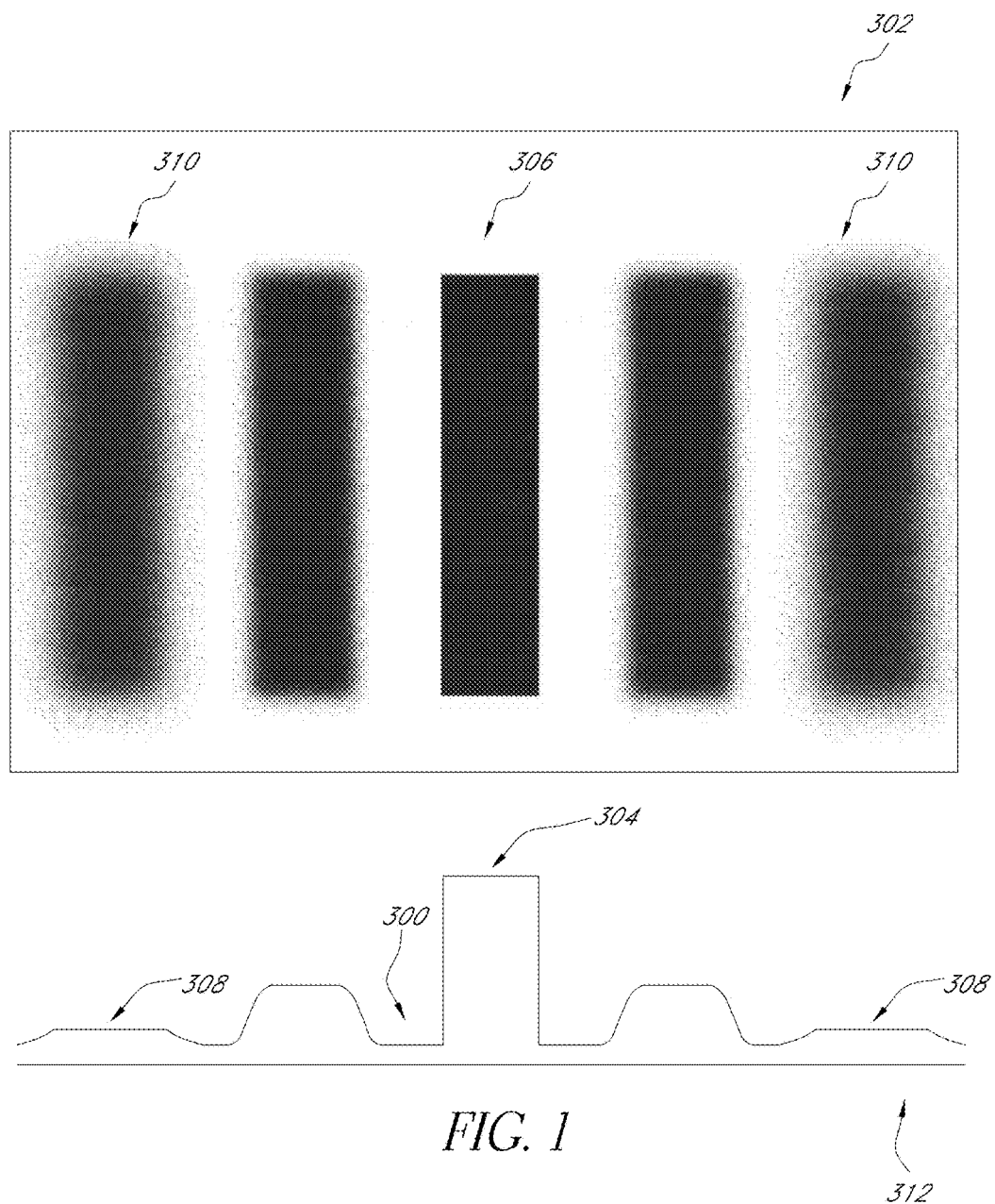
FIG. 1 shows a horizontal line graph conveying focus level data.

A wide variety of different display techniques convey focus level data to the user. For instance, FIG. 1 shows a line graph 300 oriented below the image 302. Alternatively the camera or display might show the line graph superimposed on the image. The line graph 300 displays higher values 304 for objects in greater focus 306. It displays lower values 308 for less well focused objects 310. Thus, as focus levels change for objects, the values displayed on the line graph 300 will change in response. The x-axis 312 represents a baseline level of focus, below which no focus level data is displayed. The x-axis 312 threshold may be set according to a number of different criteria. It might reflect some absolute number-value related to the slope of the gradient—the gradient being calculated by an edge detection algorithm as explained below. Or, the threshold might be tied dynamically to an average focus level of the entire image. So, the threshold could be set to 150% or 200% of the average focus level. This mechanism could be used to eliminate low, "noise" values from the display or to display data only for those display objects considered to be in focus or relatively in focus.

In one embodiment, the focus level data displayed on line graph 300 covers a continuous range of focus level values—or at least continuous in a discrete, digital sense, limited by pixels and sampling rate. Thus, a continuous range of focus levels can be displayed on line graph 300. This does not necessarily mean that the values on the line graph 300 correspond one for one to the focus level value at a given point on the image 302. The line graph 300 may be continuous, and yet represent an adjusted function of the raw focus level data that is better perceived by the user. In one embodiment, the values on the line graph 300 are discrete, i.e. the focus level values can cover a continuous range but the line graph 300 can display discrete values corresponding to focus level ranges. The number of focus level ranges can be two, three, four, five, or more than five ranges. As an example, the line graph can display a first value corresponding to a first focus level value that falls within a first focus level range, a second value corresponding to a second focus level value that falls within a second focus level range, and a third value corresponding to a third focus level value that falls within a third focus level range where the first, second, and third values are different from one another and the first, second, and third focus level ranges are different from one another.

A single, horizontal line graph 300 like the one in FIG. 1 might not accurately convey focus level information for objects oriented vertically in the image. Because the line graph displays only one value for each horizontal point, it might obscure different focus levels oriented vertically with respect to that point.

Figure 2:
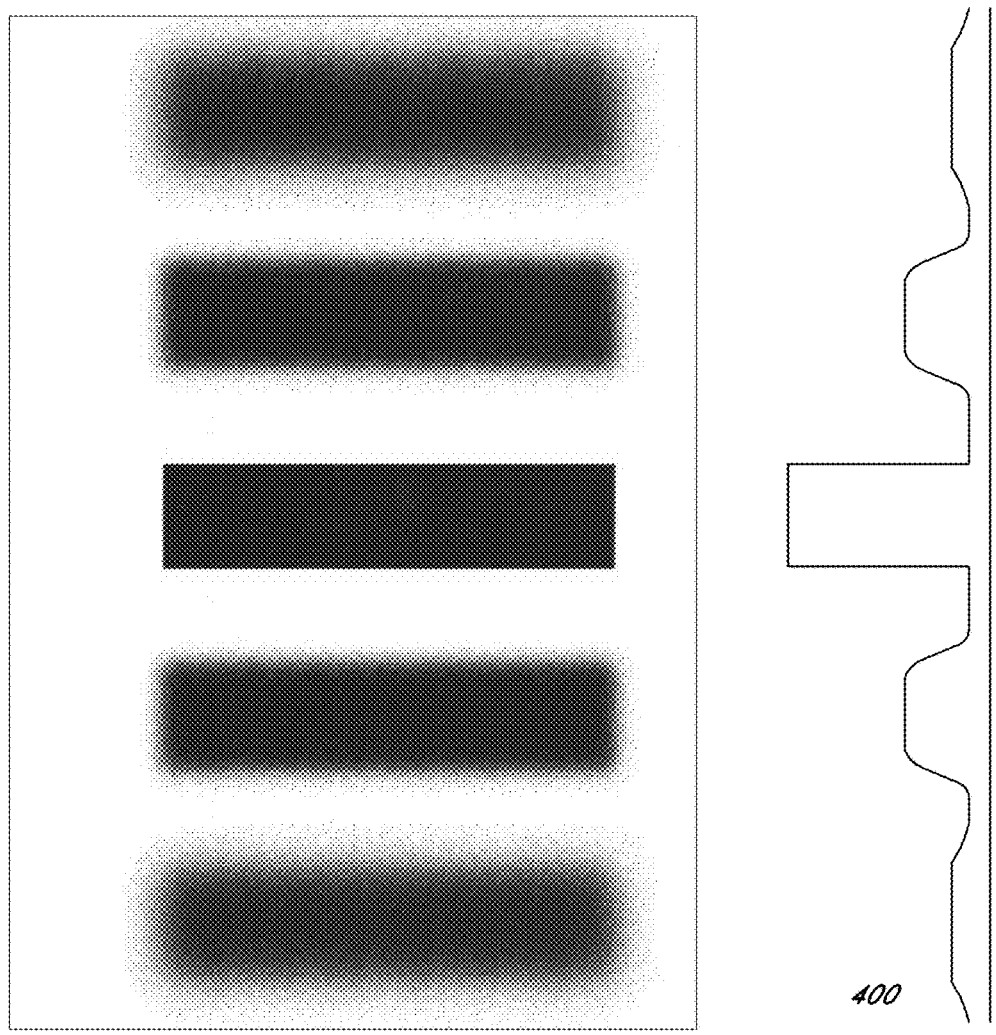
FIG. 2 shows a vertical line graph conveying focus level data.

FIG. 2 shows a vertical line graph 400 display. It displays more accurate focus level information for vertically oriented objects, but might obscure different focus levels for horizontally oriented objects. Another display might combine vertical and horizontal line graphs. Such a display overcomes some of the disadvantages of either the horizontal or vertical displays alone. But, depending upon how the data is presented, it may require the user to glance at two different locations to obtain focus level information for what may be a fleeting image.

Figure 3:
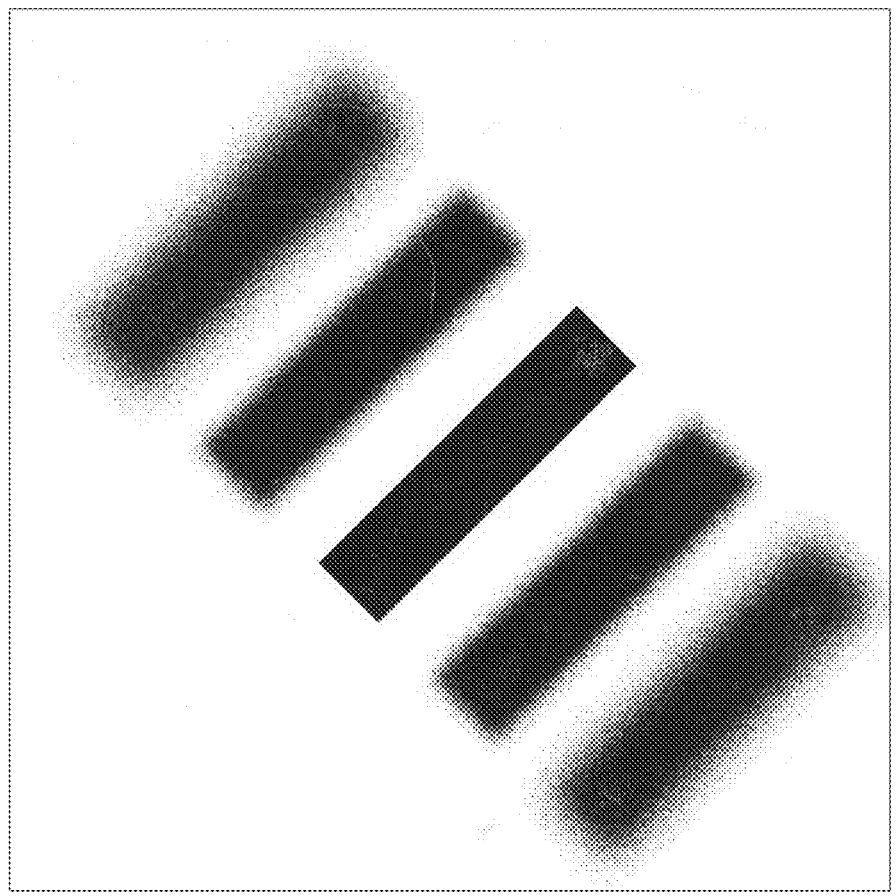
FIG. 3 shows a horizontal line graph conveying focus level data with three separate lines.
Figure 3:
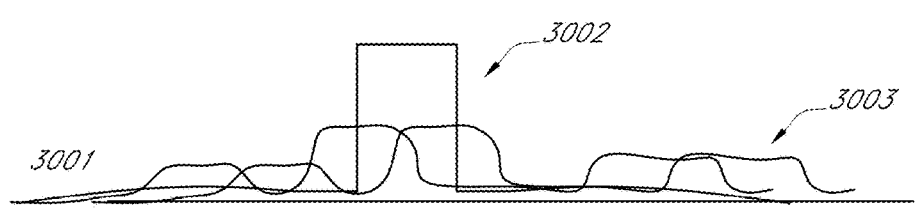

FIG. 3 shows another horizontal line graph. However, this horizontal line graph comprises several lines. Each line represents focus level information for a different area of the image 302. For example, one or more lines 3001 represent focus level information for the top of the image 302. One or more lines 3002 represent focus level information for the middle of the image 302. One or more lines 3003 represent focus level information for the bottom of the image 302. Where the focus level is very similar at the top, middle, and bottom of the image, the lines begin to overlap and intensify.

Figure 4:
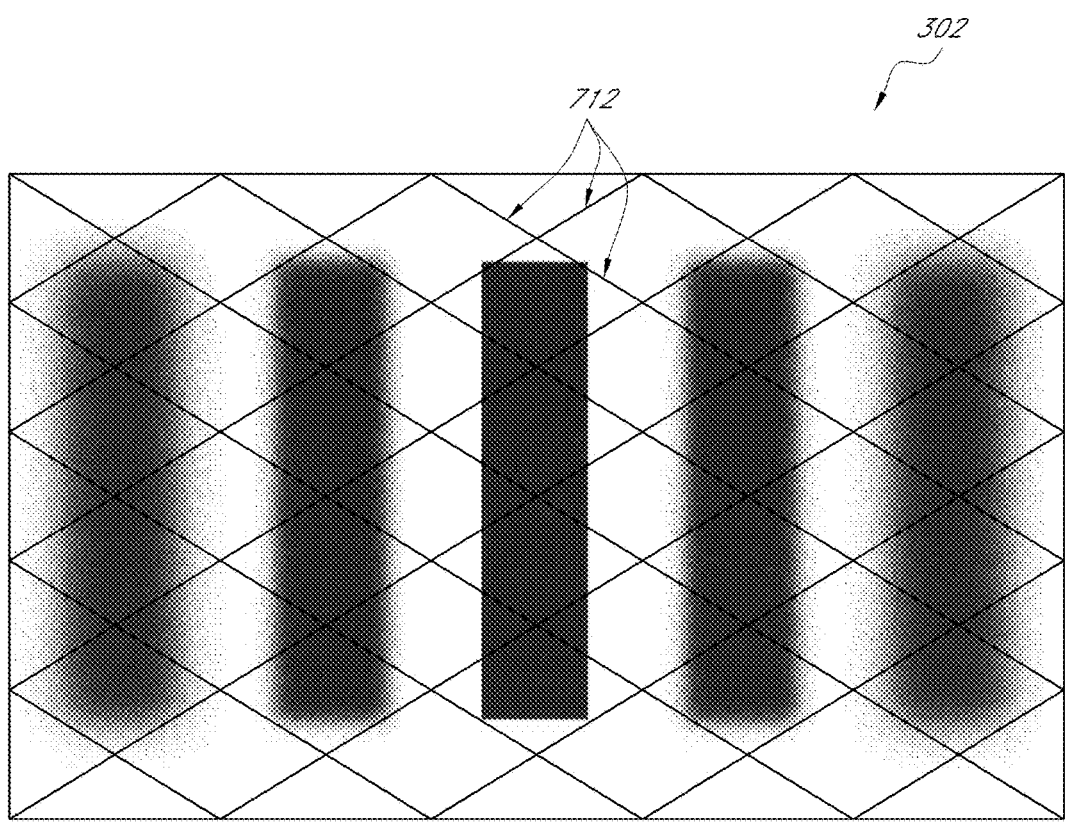
FIG. 4 shows a grid overlaid on an image, by which grid, focus level data may be calculated or displayed.

Other embodiments do not use a graph display. For instance, FIG. 4 shows a grid 712 superimposed on the image 302. The grid 712 itself need not be visible to the user. But, the grid regions 714 each indicate a focus level. One method of indicating focus level is a color tint on the region 714. So, a very well-focused region 714 might have a first color such as a red tint. A very poorly focused region 714 might have a second color such as a violet tint. Regions 714 with focus levels neither very well nor very poorly focused may carry a tint along the color spectrum, which correspond to their respective focus levels.

Another method of indicating focus level within a grid region 714 is to vary the brightness level of each region 714. A very well focused region 714 might have a first, relatively high brightness. A very poorly focused region 714 might have a second, relatively low (dark) brightness. Regions 714 with focus levels in between may carry a level of brightness corresponding their respective focus levels.

Figure 5:
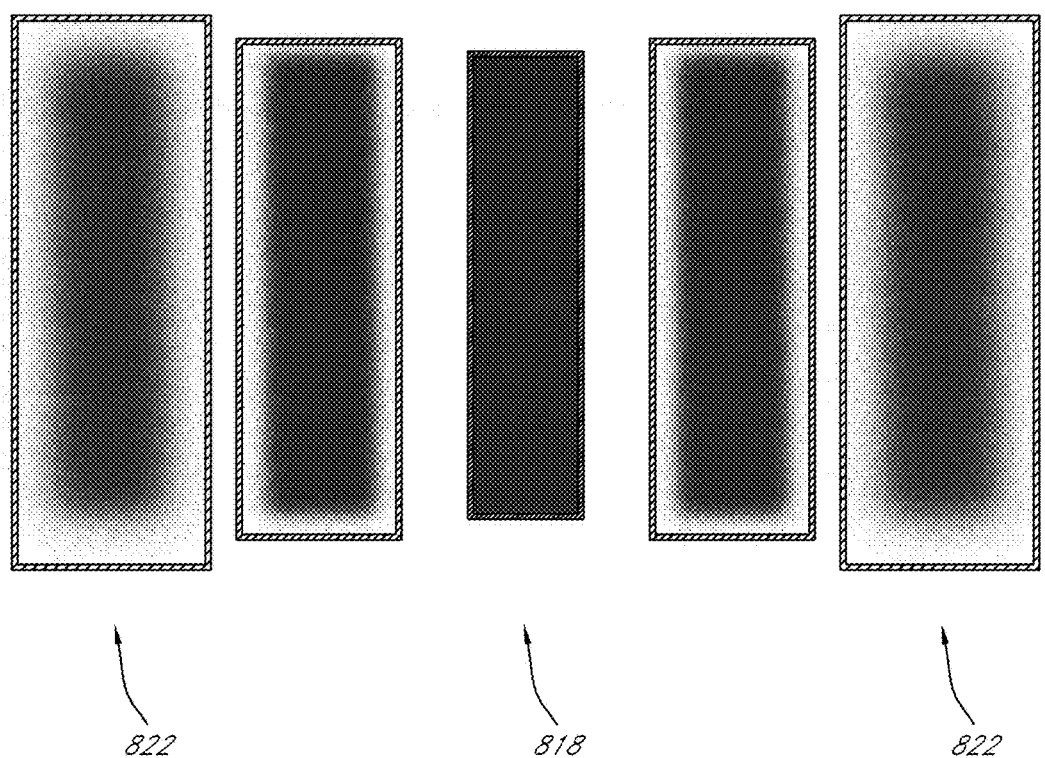
FIG. 5 shows highlights around objects, which highlights convey focus level data.

Other display embodiments highlight the objects themselves instead of using grids or graphs to display focus level data for a general area. In FIG. 5, the most focused object 306 has a bright highlight 818 that traces the object's edge. The least focused objects 310 have very dim highlights 822. The brightness of the highlight varies with the focus level of the object.

Alternatively, the display might draw a color tint around the edges of objects to indicate their respective focus levels. For instance, objects that are focused very well 306 would have a first color such as a red tint at their edge. Very poorly focused objects 310 have a second color such as a violet tint at their edge. Objects that are neither very well nor very poorly focused would carry a tint along their edge corresponding to their respective focus levels.

Rather than merely highlighting around each object, one embodiment raises the relief of an entire object when it is in focus. Objects that are out of focus 310 appear either flat or at a negative relief. Focused objects 306 rise up from the image, while unfocused objects 310 recede. The relief of each object corresponds to its focus level. This implementation has the advantage that the user can concentrate on the objects in the viewfinder to glean focus level data. Because this embodiment is highly intuitive, the user does not need to interpret much display data to determine the relative focus levels of objects in the display.

Figure 6:
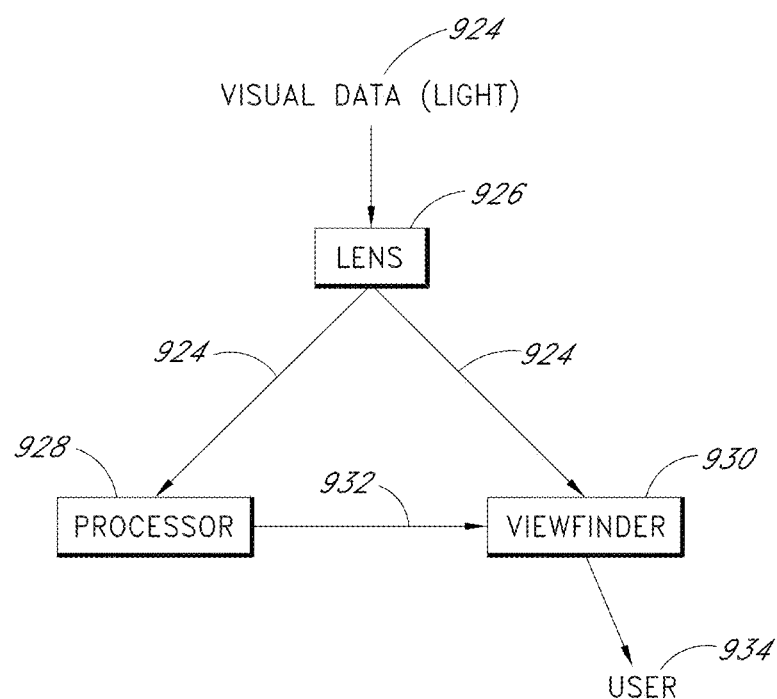
FIG. 6 shows a high-level diagram of the focus assist system.

FIG. 6 shows an embodiment of the architecture of a camera. The camera collects visual data 924 from the camera lens 926. The camera records the visual data 924 and displays a representation of the visual data 924 on the viewfinder 930. The camera also sends the visual data 924 to a processor 928. The processor uses an algorithm to compute focus level data 932 for the visual data 924. The processor sends that focus level data 932 to the viewfinder, where the user 934 sees it superimposed on the visual data 924. The viewfinder 930 shows focus level data 932 from the processor 928 and visual data 924 from the lens 926 contemporaneously.

In an alternative embodiment (not shown), in an autofocus camera, the processor that accepts the visual data and computes the focus level data is also the processor that computes focus level data for the autofocus system. An autofocus system automatically generates focus level data to determine the proper focus level setting. In this embodiment, that data is reused. Not only does the camera use the focus level data to achieve an optimal focus setting, but the data is also sent to the user through the viewfinder. The user can then confirm that the autofocus system has identified and set the focus level for the object or objects in which the user is interested.

The processor uses an algorithm to calculate the focus level data displayed to the user.

In one embodiment, the processor blurs image data to create a comparison image. For instance, the processor might use a Gaussian or quick box blur approximation, or convolve the image. The blurred image differs from the original image primarily at the edges of focused objects 306. With focused objects 306, the blurring process washes out the sharp contrast between the edge of the object 306 and its surroundings. The blurring process creates less change at the edges of unfocused objects 310. The soft contrast between an unfocused object 310 and its surroundings remains a soft contrast in the blurred, comparison image. Because edges are typically composed of the pixels that change the most during the blurring process, it is possible to find the edges of focused objects.

Several alternative algorithms exist to detect whether or not an image is in focus. Many of these are "edge detection" algorithms. Examples of edge detection algorithms can be found in *Fundamentals of Digital Image Processing* by Anil K. Jain, the entirety of which is incorporated here by reference.

One algorithm uses gradient operators to detect edges. Gradient operators are masks, or simple matrices, used to generate a gradient map. Gradient operators, when convolved with pixels in an image, yield a gradient map in two orthogonal directions. Similarly, compass operators yield a gradient map in a selected number of directions that correspond to compass directions. Once the gradient has been calculated, an edge is identified by searching for those spots where the gradient exceeds some threshold. The level of focus, generally, corresponds to the severity of the gradient.

Other edge detection algorithms apply a second-order derivative to the image. The derivative detects rates of change in pixel intensity across the image. Again, the algorithm usually convolves the image with an operator. Edges are identified by locations where the gradient exceeds some threshold, or more commonly, by searching for spots where the second derivative wave-form crosses zero. While zero crossings are useful to detect edges, they only return a binary value and therefore do not convey precise focus level data. Here again, the focus level generally corresponds to the severity of the gradient at objects' edges.

The gradient measures changes in the intensity of adjacent pixels. The intensity may be measured according to one or more of several different elements of each pixel. The intensity may refer to the red, green, or blue content of a pixel or any combination thereof. In YCbCr systems, it may refer to the luma or chroma component of each pixel or a combination thereof. In HSV systems, it may refer to the hue, the saturation, or the brightness components of the pixel, or any combination thereof. Depending on the color space of processing and display systems, the processor may use whichever components of the pixels' value that obtain the optimal gradient map or optimal focus level data.

One way of using an edge detection algorithm to derive focus level data for an entire image—rather than its edges only—is to use boundary extraction. By connecting edges, boundaries define the shape of an object. Assuming that an entire object is in focus if its edges are in focus, the camera can use boundary detection to determine the object's shape and impute the focus level at the object's edge to the rest of the shape.

A contour following algorithm is a boundary extraction algorithm that uses a series of horizontal or vertical steps chosen by trial and error. The correct step is determined by whether the step arrives inside or outside a boundary.

Another boundary extraction algorithm uses the computer science principle of dynamic programming. With dynamic programming the solution to a large problem is a function of the solutions to its sub-problems. In the boundary extraction context, that means that optimal sub-paths will lead to the optimal boundary.

The focus level detection algorithm measures focus level for a selection of pixels. The number and location of the pixels for which the algorithm calculates focus level data are a function of the speed of computation, detail of focus level data, and type of focus data desired to be displayed to the user.

Figure 7:
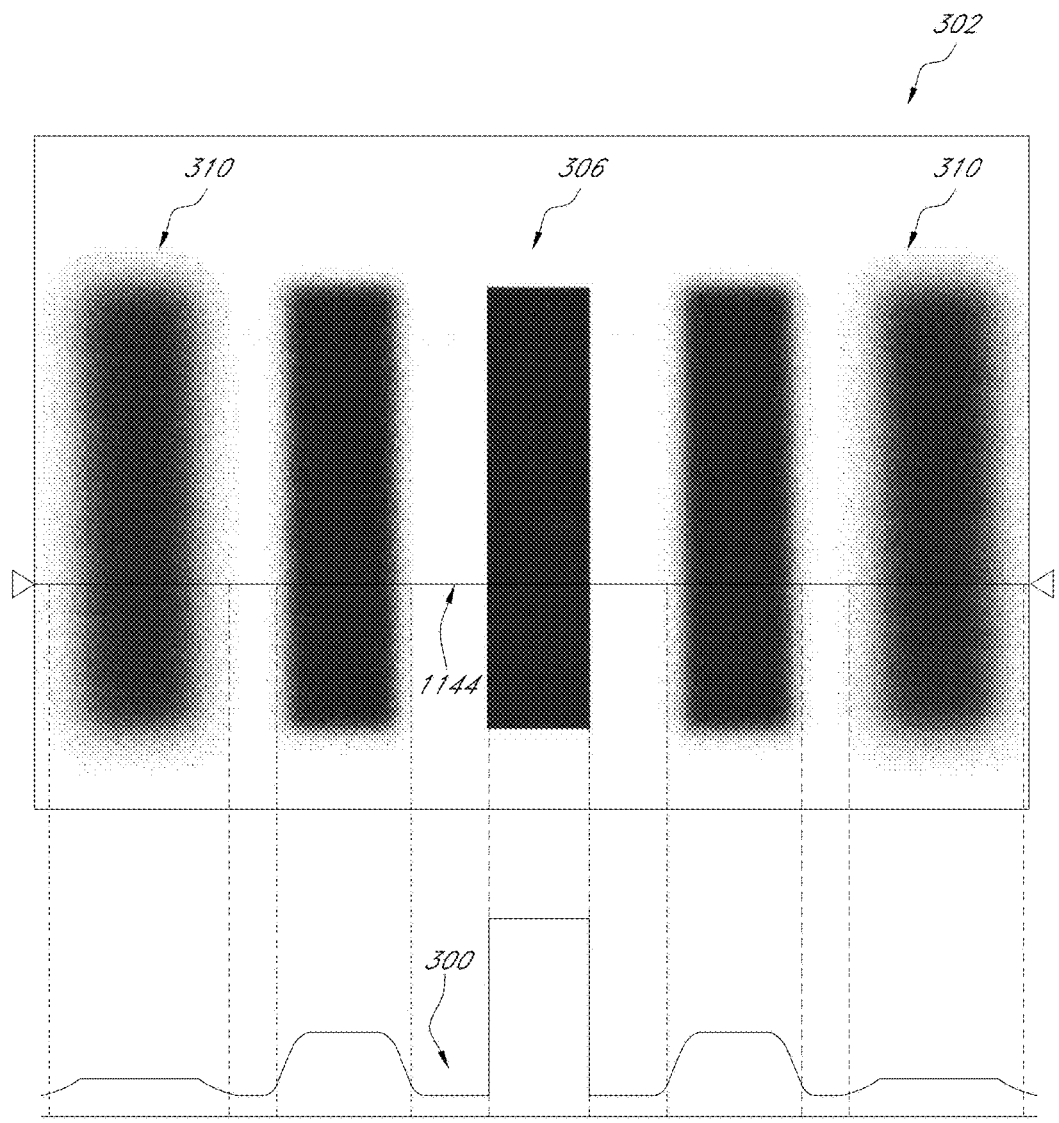
FIG. 7 shows a horizontal line graph conveying focus level data from a horizontal scan line.

In one embodiment, the focus level algorithm calculates focus level data for one or more "scan lines." The simplest example of the scan line embodiment is depicted in FIG. 7. In that figure, a single scan line 1144 extends horizontally across the image 302. The scan line 1144 need not be vertically centered. The user can adjust the position of the scan line 1144. The focus level algorithm calculates a focus level value for each pixel along the scan line 1144 and displays it as a point along line graph 300. In another embodiment, to save processing time, the focus level algorithm might measure no more than about 50% or no more than about 25% of the pixels, such as by measuring only every other pixel or only one of every several pixels on the scan line 1144. Line graph 300 shows how the focus level display corresponds to the focus level measured at each pixel along the scan line 1144. As the focus level measured at each pixel along the scan line 1144 changes, the focus level display shown by line graph 300 will change in response by decreasing and/or increasing portions of the line graph 300.

Figure 8:
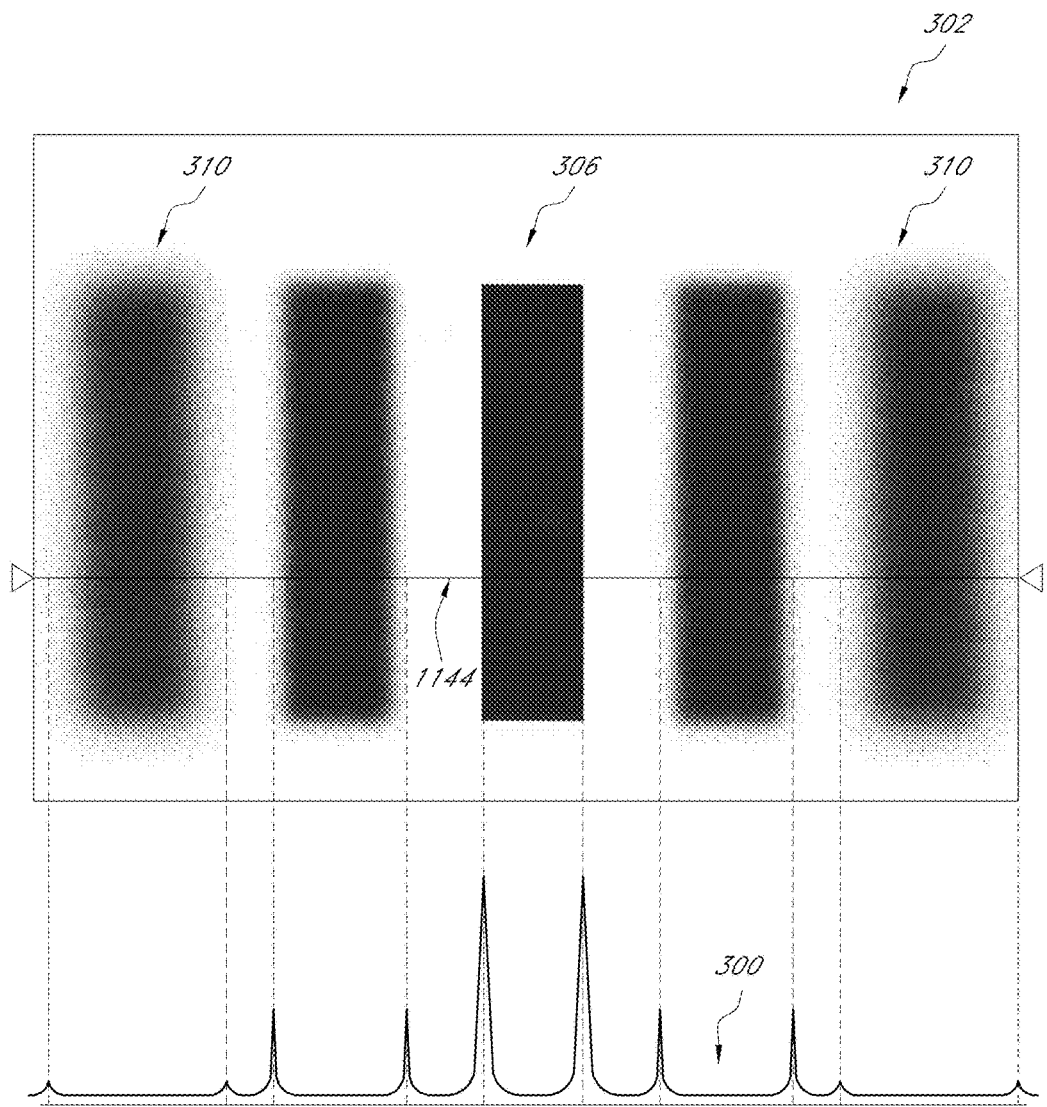
FIG. 8 shows a horizontal line graph conveying focus level data from a scan line, wherein the focus level data has been calculated using an edge detection algorithm.
Figure 11:
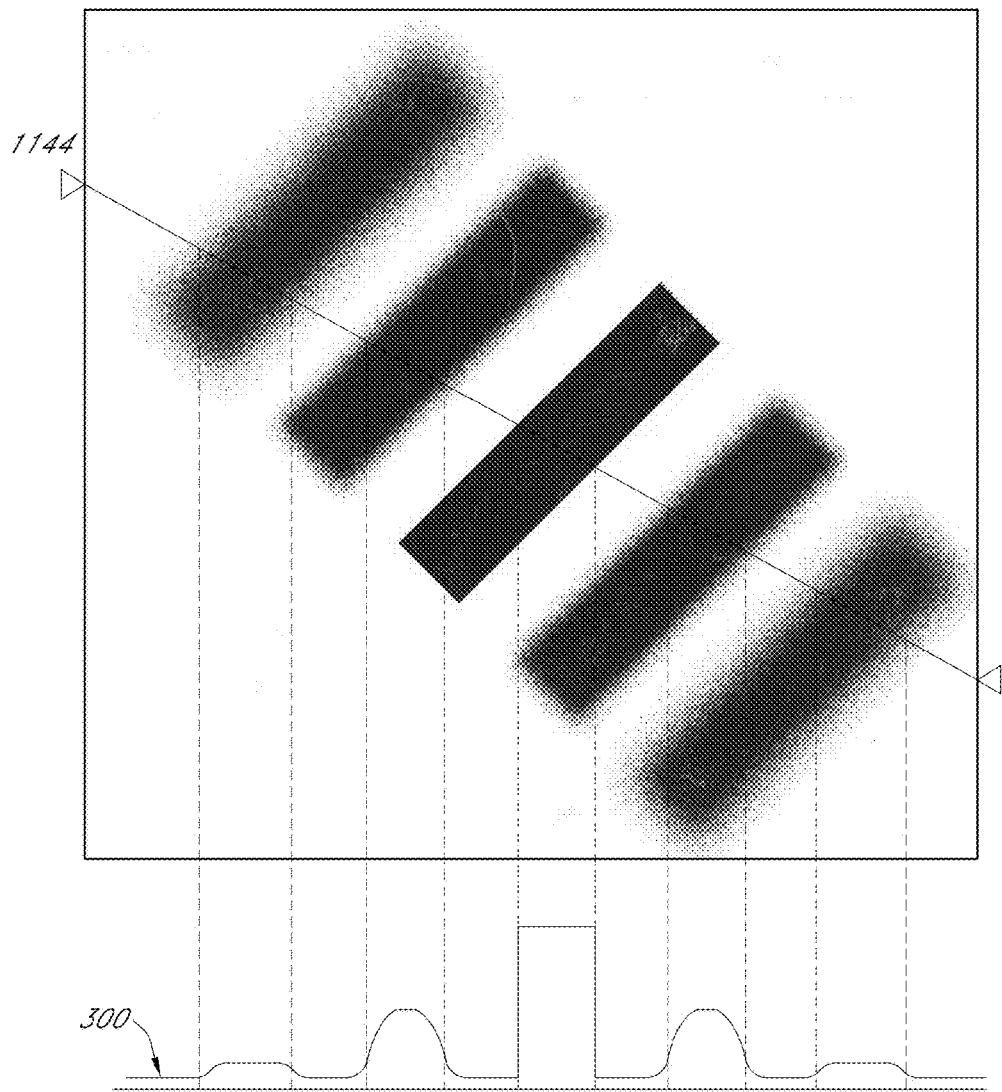
FIG. 11 shows a horizontal line graph conveying focus level data from a sloped scan line.

In FIG. 8, the scan line 1144 and display technique are identical to those of FIG. 11. But, instead of a smooth waveform, the line graph 300 has spikes. This spiked waveform depicts the data produced by an edge detection algorithm. The focus level data is more accurate at the edges of objects. At the edges of bars that are focused 306, the graph 300 shows a high value. Likewise, at the edges of bars that are not focused 310, the graph 300 shows low values. As the focus changes from one object to another, the graph 300 will show changing values at the edges of bars corresponding to changes in focus level data. But, the graph 300 does not show high or low values for the middle parts of objects. In the middle parts of objects, the correspondence between high contrast—on which edge detection algorithms rely—and high focus, is less reliable. This is because the middle parts of objects are less likely to have high contrast values whether they are in focus or not.

Figure 9:
FIG. 9 shows a vertical line graph conveying focus level data from a vertical scan line.
Figure 10:
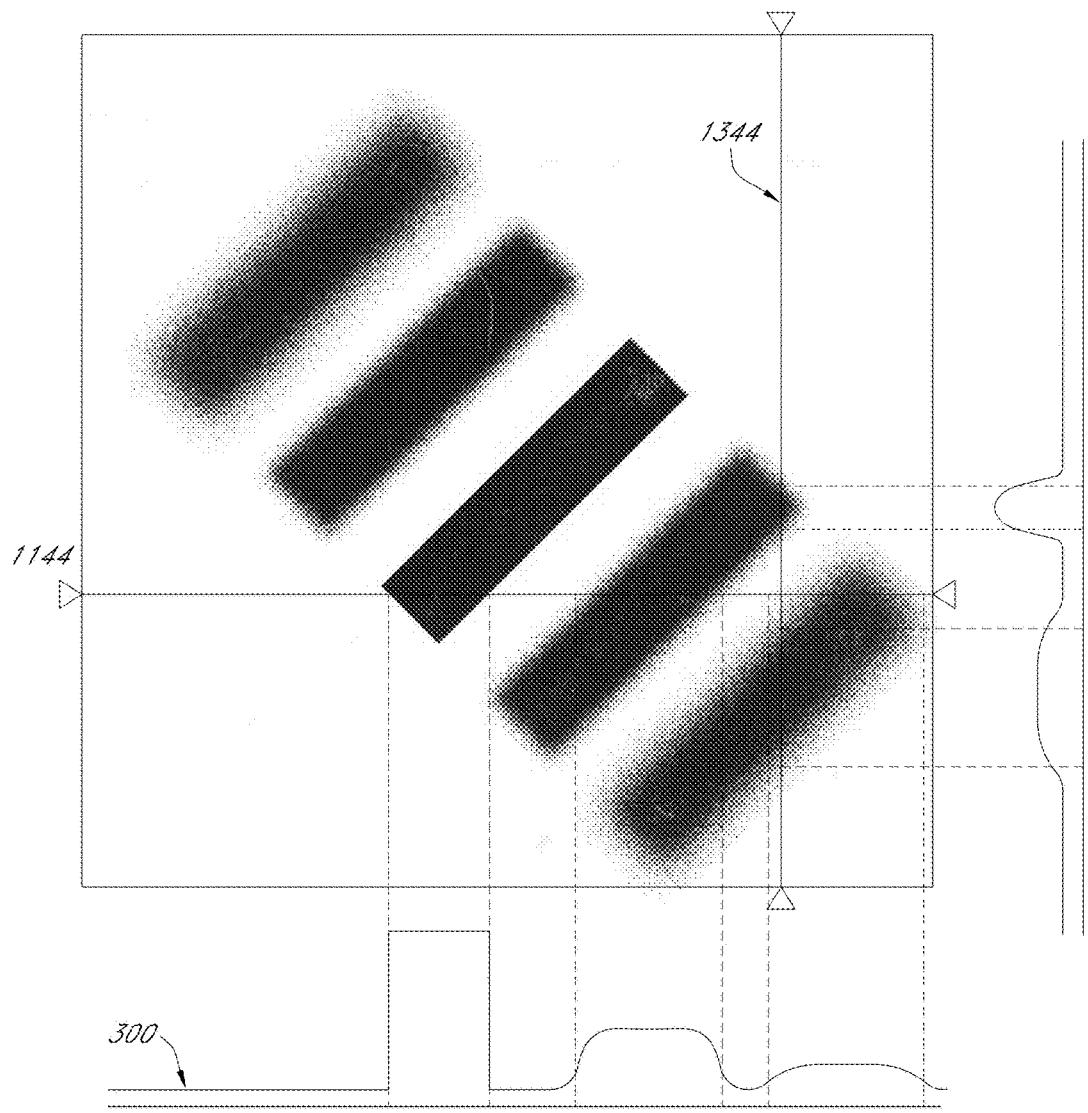
FIG. 10 shows horizontal and vertical line graphs conveying focus level data from horizontal and vertical scan lines, respectively.

The scan line 1344 might be vertically oriented, as in FIG. 9, rather than horizontally oriented. A vertical scan line 1344 gives better focus level data for a series of objects oriented vertically in the viewfinder. Like the horizontal chart for a horizontal scan line, a vertical chart 400 displays focus level data for a vertical scan line. Another, more detailed embodiment depicted in FIG. 10 employs both vertical 1344 and horizontal 1144 scan lines and both vertical 400 and horizontal 300 graphs.

The scan line need not run precisely horizontally (or vertically) across the image. The scan line 1144 might run at a slope, as in FIG. 11.

Figure 12:
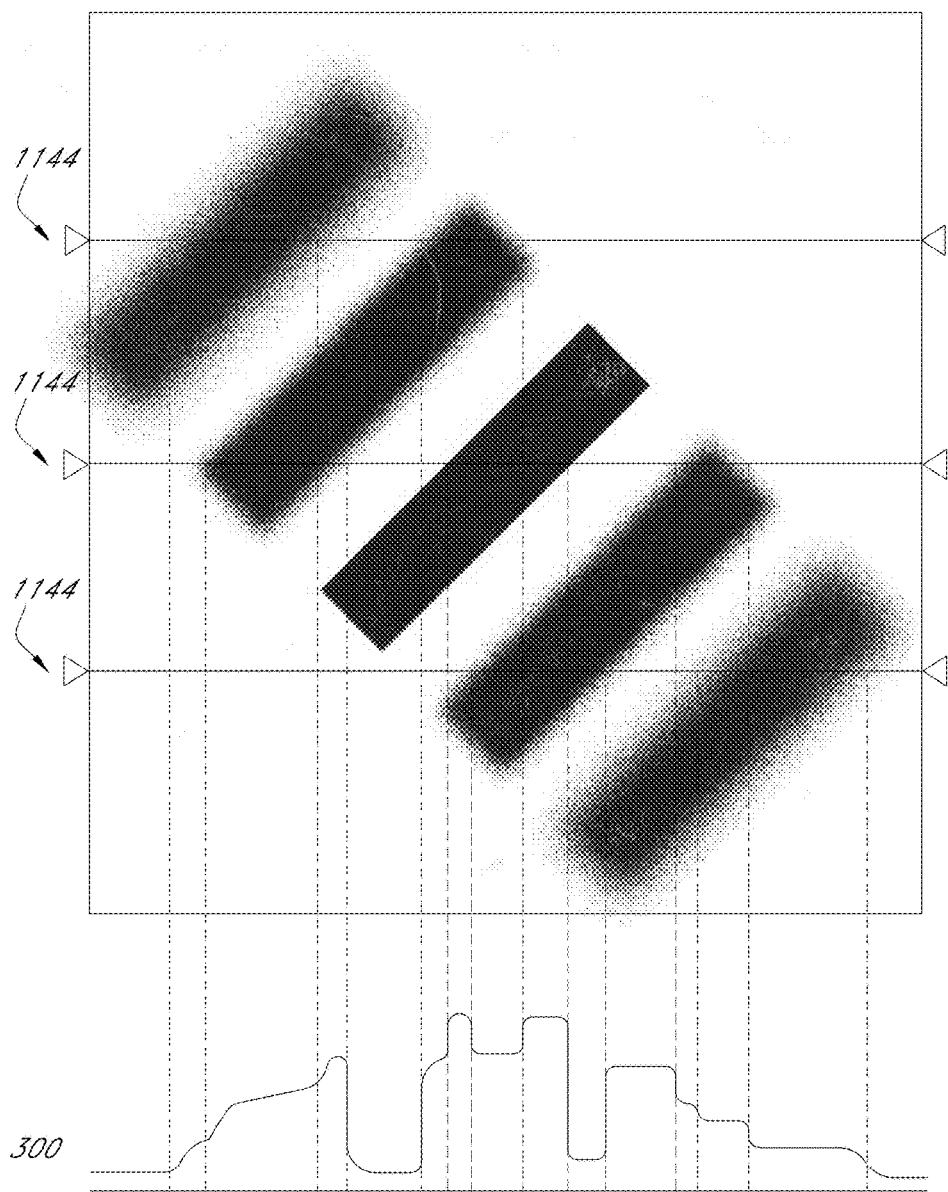
FIG. 12 shows a horizontal line graph conveying focus level data averaged from three scan lines.

In FIG. 12 the display again consists of a single-line graph 300. And, the algorithm again uses scan lines to identify the pixels for which it will calculate focus level data. But, instead of using only a single scan line, the algorithm averages data from multiple scan lines 1144, such as at least two, in some embodiments at least five, and in other embodiments at least 10 scan lines. Depending on the location of the scan lines and of objects in the image, this technique may improve the accuracy of the focus level display. The more scan lines 1144 the processor employs, the more focus level data it collects and the more accurate it will be. But, the more scan lines 1144 the processor employs, the more computations it must run and the slower it will generate focus level data. Again, the camera might use vertical scan lines 1344 instead of or along with horizontal scan lines 1144 for this or any scan-line technique.

Figure 13:
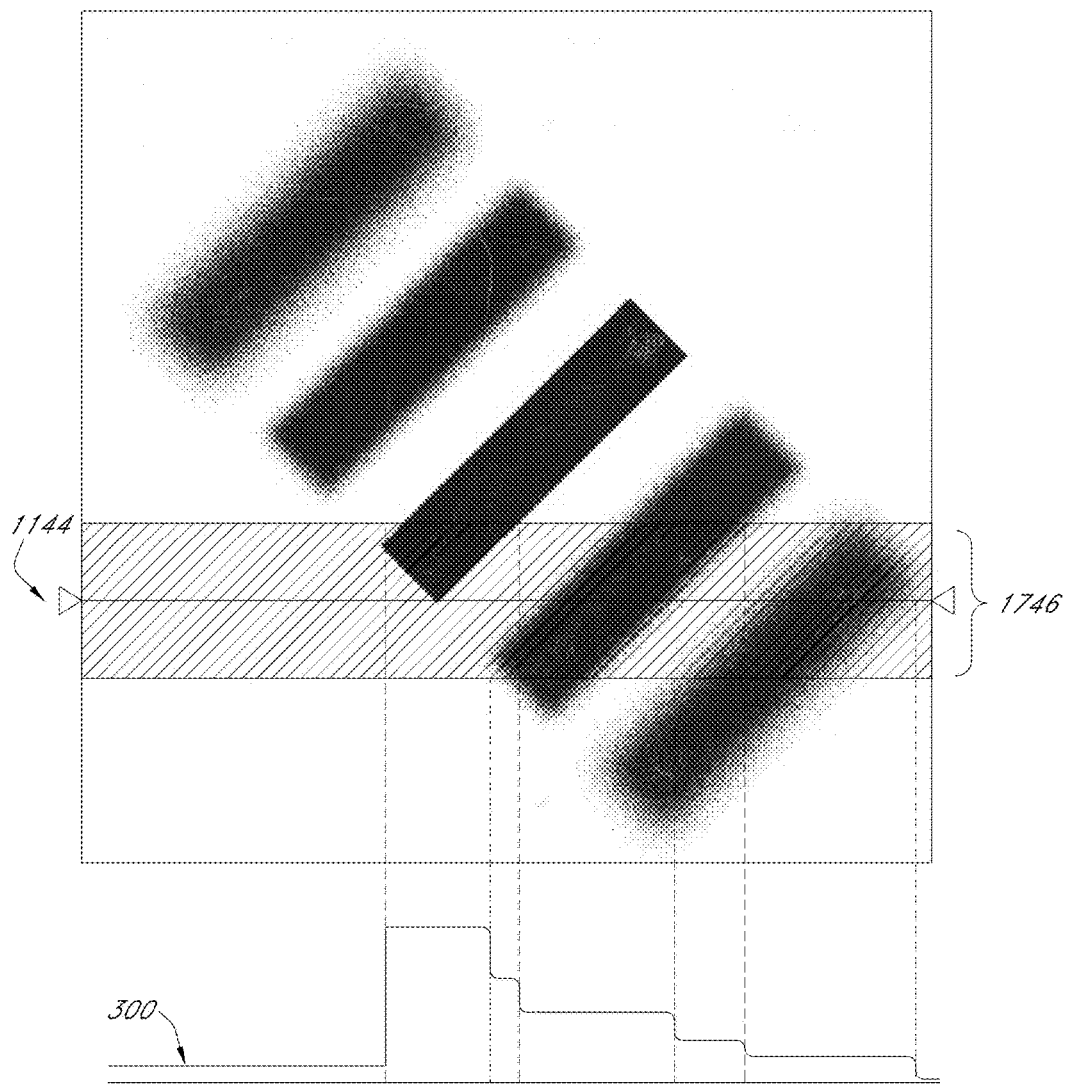
FIG. 13 shows a horizontal line graph conveying focus level data averaged from a scan line greater than one pixel wide.

FIG. 13 shows yet another embodiment based on the scan line. However, in this embodiment, the scan line 1144 is greater than a pixel in width. The scan-line width 1746 may be set to as many or as few pixels as desired. In fact, this is a variation on the multiple scan-line embodiment depicted in FIG. 12. A scan line 1144 a number of pixels in width 1746 is the same as that same number of adjacent scan lines, each one pixel in width. For example, the average focus level of a scan line 1144 five pixels wide 1746 is identical to the average focus level of 5 scan lines 1144, each adjacent to the next. To limit power consumption or decrease computational time, the processor might calculate focus level data only for every other adjacent scan line 1144 or one of every several adjacent scan lines 1144.

Figure 14:
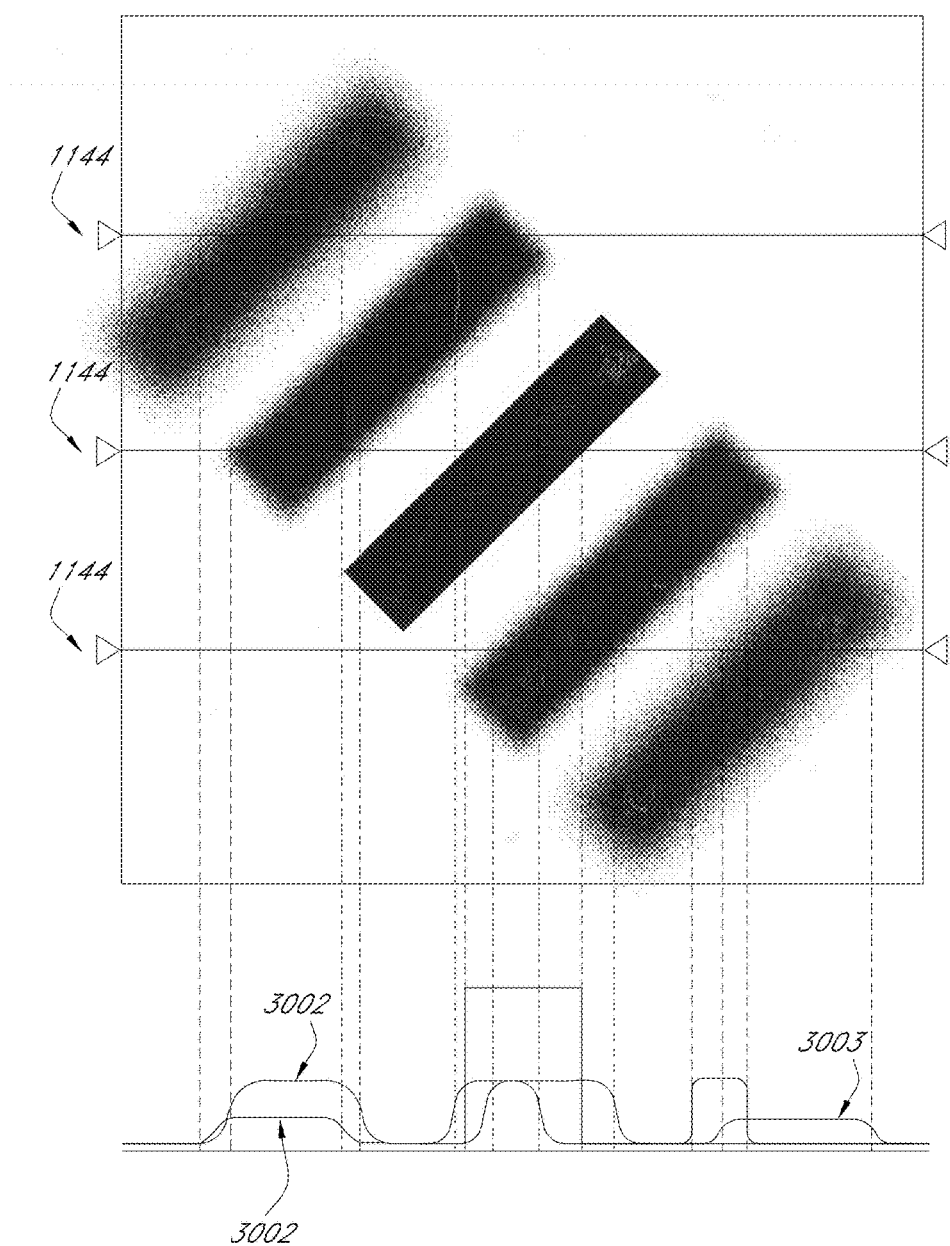
FIG. 14 shows a horizontal line graph conveying focus level data with three separate lines, each of which lines corresponds to a different horizontal scan line.

The processor need not generate an average focus level for multiple scan lines. FIG. 14 shows a graph display with a graph line 3001-03 corresponding to each scan line 1144. Alternatively, each graph line might convey average focus level data from multiple scan lines as an aid to the user.

In addition, the processor 928 might apply a secondary filtering algorithm to the focus level data from one or more scan lines. For instance, the processor 928 might apply an algorithm that zeroes all focus level values below a certain threshold. Such an algorithm might be used to eliminate noise from the display, to avoid distracting the user.

The threshold may or may not be set at the same point as the baseline x-axis 312 in the display, depending on the desired height of the line graph 300 in the display. Indeed, the camera might allow the user to set the threshold. Like the x-axis 312 baseline, this algorithmic threshold might be set according to either an absolute value related to the slope of the gradient, as calculated by an edge detection algorithm. Or, it might be a function of the average level of focus of the image. For instance, the algorithm might eliminate focus level values for objects that have less than a threshold such as about 150% of the average focus level of the image. A secondary algorithm might also be used to smooth the focus level data, again to present a simplified, easily perceived waveform to the user. This technique might be useful with edge detection algorithms, which tend to produce spikes.

In short, the scan line embodiments are not limited by any particular scan lines or choice of pixels within those scan lines. Rather, the scan lines might be implemented in any permutation that satisfies a desired balance between computational speed, detail of information, and method of display to the user.

Scan lines are merely one method of applying a focus level detection algorithm. The algorithm might compute focus level information for the entire image, or for some alternative subset of that image. That alternative subset may be a geometric area. The geometric area might be defined by the user or it might be set by an algorithm, for example, to track a moving object in the viewfinder. The alternative subset might also be a pattern of pixels, designed as a representative sampling of the image, but at a lower level of detail and therefore requiring fewer computations.

In order to display focus level data in the pattern of a grid, the algorithm calculates focus level data for at least a portion of each region within the grid. The algorithm might calculate focus level data for only a pixel within each region. The algorithm might calculate focus level data for the entire region and average the data to display an indication of the focus level.

If the algorithm calculates enough focus level data—at least enough for a representative sampling of the image—it is possible to display to the user focus level information based on edges superimposed on the image. Because an edge-detection algorithm returns data that corresponds to the edges of each object, the display might use that data to highlight the edges of objects in the viewfinder in real time. This might be done by varying the brightness of the edges of objects or by drawing a color around objects, the shade or width of which would correspond to the degree of focus.

Algorithms that generate reliable focus level data for entire objects enable other display techniques. One display varies the relief of an object according to its focus level. So, in focus objects would bulge out of the picture and become more prominent than unfocused objects. Similarly, another display renders objects in three dimensions when they are focused. The further out of focus the object becomes, the flatter it becomes in display. Additionally, in some instances the display allows a user to present detailed focus level information for select portions of the image scene. For example, some displays allow for magnification of certain image scene regions and adjust the presentation of the focus level data to accommodate the current view.

Figure 15A:
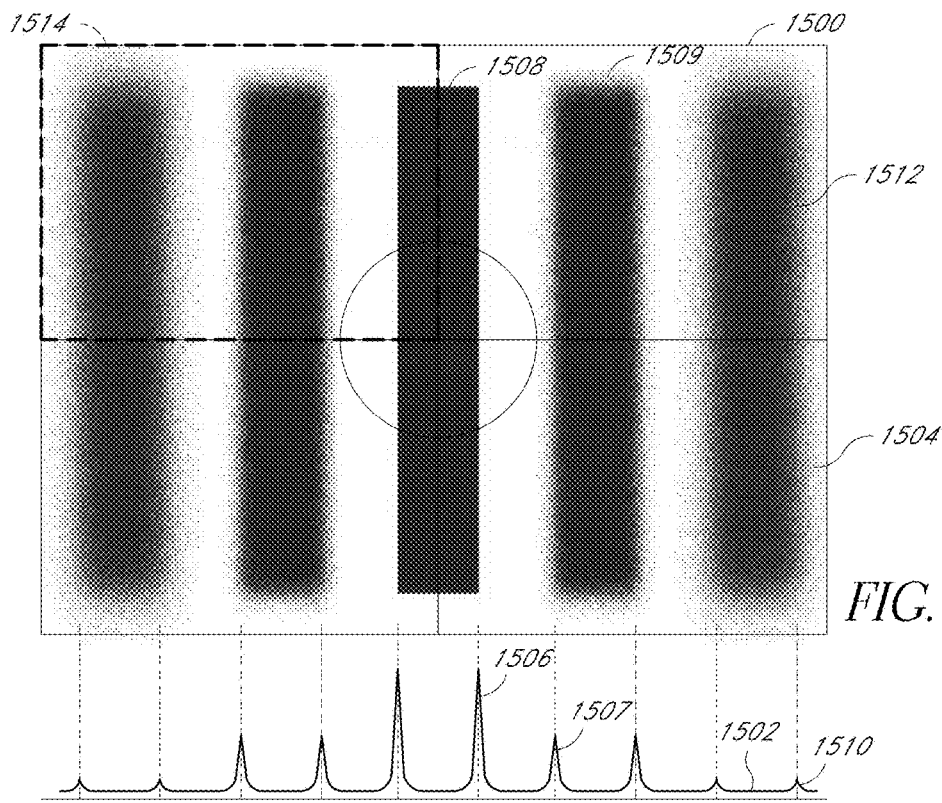
FIGS. 15A-15C show an example display having focus assist capability integrated with a magnification function.
Figure 15B:
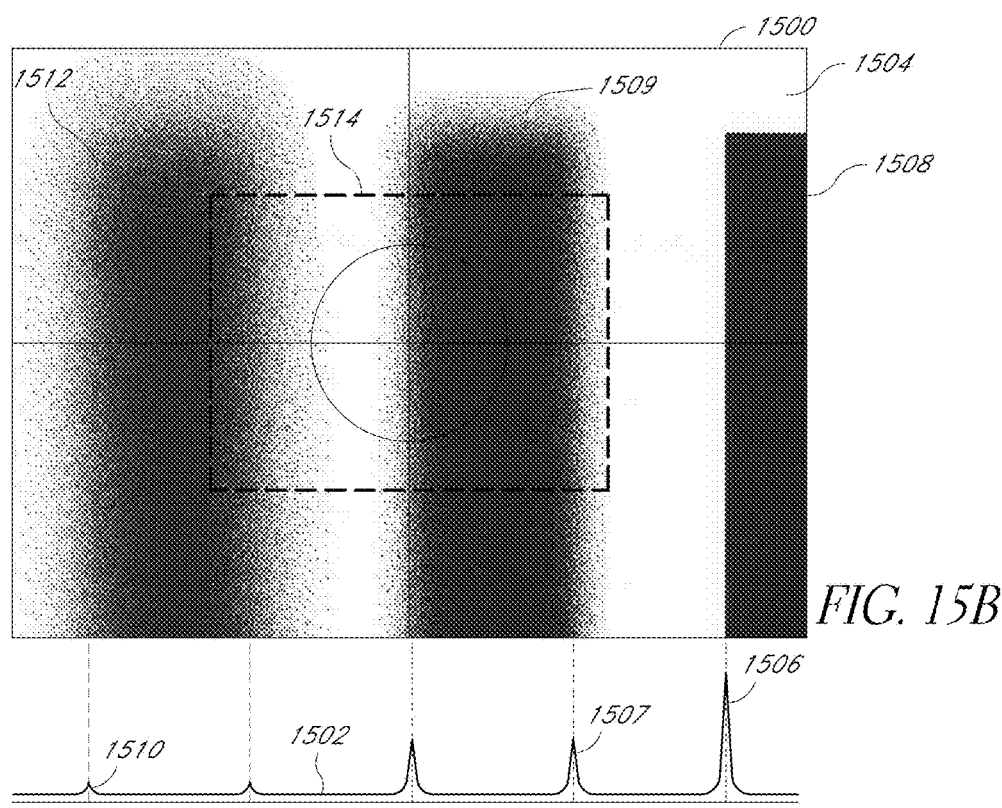
Figure 15C:
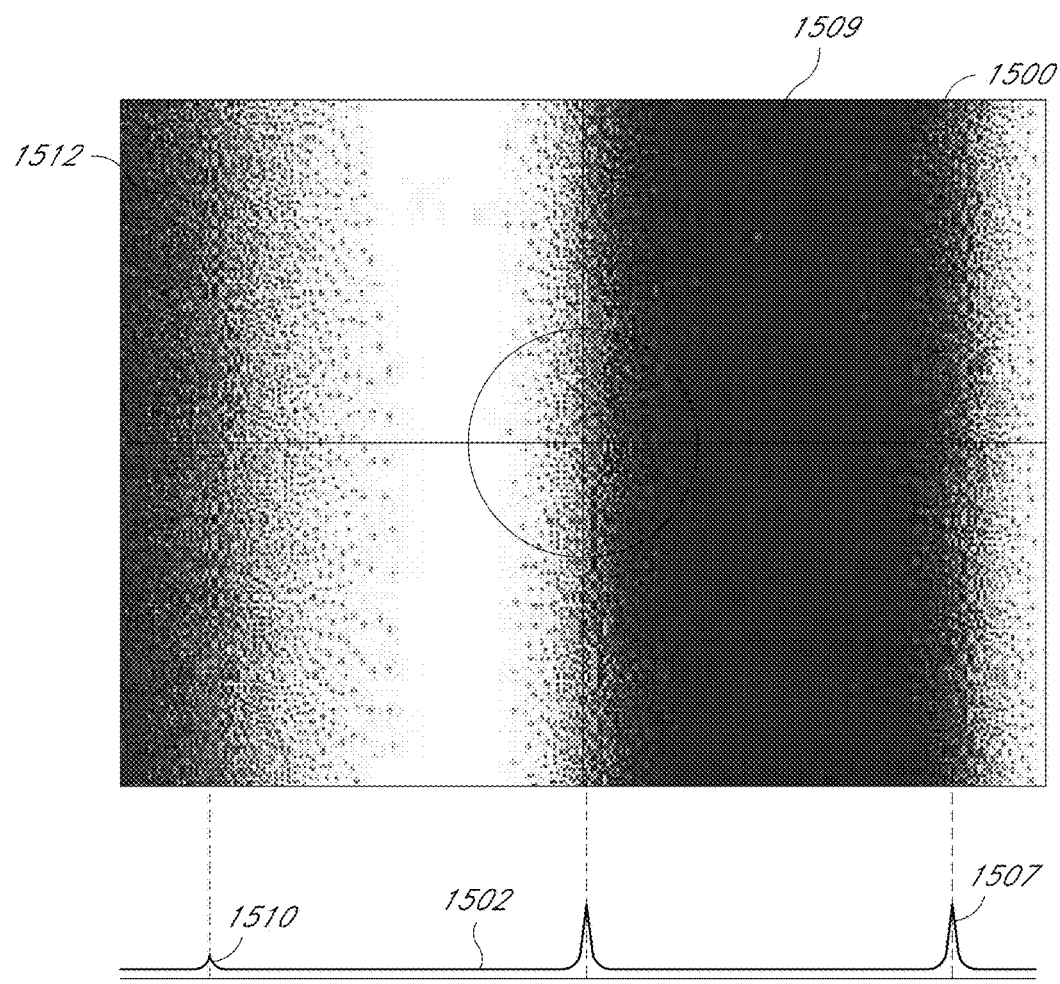

FIGS. 15A-15C show an example display 1500 having focus assist capability integrated with a magnification function. The display 1500 conveys focus level data from a scan line, wherein the focus level data has been calculated using an edge detection algorithm. Moreover the graph 1502 has spikes corresponding to the focus level data produced by the edge detection algorithm. Thus, like the graph 300 of FIG. 8, at the edges of objects that are focused 1508, the graph 1500 shows a high value 1506. Likewise, at the edges of objects that are not focused 1510, the graph 1500 shows low values. Further, at the edges of bars that are focused at an intermediate level 1509, the graph 1500 shows intermediate values 1507. But, the graph 300 does not show high or low values for the middle parts of objects. In the middle parts of objects, the correspondence between high contrast—on which edge detection algorithms rely—and high focus, is less reliable. As discussed above, this is because the middle parts of objects are less likely to have high contrast values whether they are in focus or not.

Generally, the display 1500 shows the focus level information in a manner that is visually correlated with corresponding image regions. For example, the illustrated display 1500 shows the graph 1502 oriented below the image 1504.

Moreover, the waveform regions 1506, 1507, 1510 are lined up with the edges of the corresponding bars 1508, 1509, 1512. Alternatively, the display 1500 might show the graph 1500 superimposed on the image 1504 or may present the focus information according any of the other techniques described herein. For example, as discussed further below with respect to FIGS. 16A-16B, in another instance the display 1500 visually associates the focus level information with regions of a grid that are overlaid on corresponding portions of the image 1504. The display 1500 is also responsive to user input to magnify a portion 1514 of the image 1504. FIG. 15A shows the display 1500 in an unmagnified state, and thus the entire image 1504 is visible.

FIG. 15B, on the other hand, shows an example of the display 1500 in a magnified state. In the illustrated case, the user has selected the region 1514 corresponding to the upper left quadrant of the image for magnification. The camera may or may not actually display the dotted line delineating the magnified region 1514. While the representation of the region 1514 is magnified on the display 1500, the zoom level of the camera according to certain embodiments is adjusted independently. Thus, the camera includes a separate control to magnify the display 1500, and the zoom level of the lens does not change in response to user interaction with the separate magnification control. In one embodiment, the camera includes a touch screen interface allowing the user to adjust the magnification. For example, the user may double-tap the desired region 1514 for magnification. In another instance, the user increases or decreases the level of magnification using a multi-touch gesture, such as by spreading apart and pinching together his or her thumb and forefinger on the portion of the display corresponding to the desired image region. A wide variety of other touch screen control mechanisms are possible. Moreover, other types of interfaces can be used instead of or in addition to touch screens, including, but not limited to, joysticks, keypads, and the like.

The display 1500 can allow the user to manipulate the display in a variety of ways. For example, in some cases, after achieving the desired magnification level the user manipulates the display 1500 to scroll to another portion of the image 1504. Referring to FIGS. 15A-15B, for example, after magnifying the region 1514 (FIG. 15B), the user can scroll to view another region of the magnified image. The user may do so using a swiping gesture where a touch screen interface is provided, or using a directional keypad in another configuration. Moreover, as shown, the display 1500 can update the focus level information depicted in the line graph 1502 to correspond to the newly displayed portion of the image 1504. The update can occur or at least appear to occur in substantially real-time.

Additionally, while one magnification level is shown in FIG. 15B, in certain instances the display 1500 allows for further zoom levels. FIG. 15C shows such a case, where the user selects the region 1514 (FIG. 15B) corresponding to the center of the image 1504 for further magnification. The transition to the desired magnification level is continuous in some cases, or there may alternatively be one or more discrete zoom levels (e.g., 1×, 2×, 4×, 8×, etc.).

In some embodiments, the user may select any desired portion of the image scene for magnification. In other instances, the image scene areas selectable for magnification are predefined. For example, referring to FIG. 15A, in one instance the user can only zoom in on one of the predefined image scene quadrants at a given time. Where the areas are pre-defined, the display 1500 may nonetheless provide more than one level of magnification.

The display 1500 can provide enhanced focus information when in the magnified state, enabling higher precision focus control. Referring again to FIGS. 15B-15C, the display 1500 dynamically updates the line graph 1502 to accommodate the change in magnification. In the magnified state, the display 1500 presents the focus information for the displayed objects with a higher degree of granularity. Thus, users can make relatively finer distinctions between gradations in the focus level than in the zoomed-out state, providing improved focus control.

As another example, the image scene might include a large number of objects such that the objects may crowd together on the display. Thus, the corresponding portions of the graph 1502 may also bunch together, making it difficult to interpret the focus information. However, in such cases, the user can to drill-down on particular regions of the scene. Thus, the objects and corresponding focus level data in the magnified portion will appear relatively less crowded, making it easier to distinguish between focus levels for closely spaced objects.

When focus assist information is combined with magnification capability, the system can calculate the enhanced focus assist information according to any of the algorithms provided herein, or according to some other appropriate algorithm. Moreover, the display 1500 can present the focus level data in a variety of ways. For example, the system can display one or more magnified regions with one or more visual indications for each magnified region, where the size, shape, and/or color of the visual indication conveys focus level data.

In one alternative configuration, the display presents a magnified version of the selected image region, but continues to show the un-magnified version of the image as well. For example, the display presents the selected magnified portion of the image in a separate window that consumes only a portion of the display area. The separate window can be overlaid onto the un-magnified version of the image, or be displayed adjacent to it. Moreover, the display can provide a graph (or other focus level indication) associated with the magnified portion instead of, or in addition to, the graph for the un-magnified image. This technique enables detailed focus information for select image regions, but also in context with the entire scene. In other instances, the display provides detailed focus level information for the select region, but the selected image region itself is not magnified.

Figure 16A:
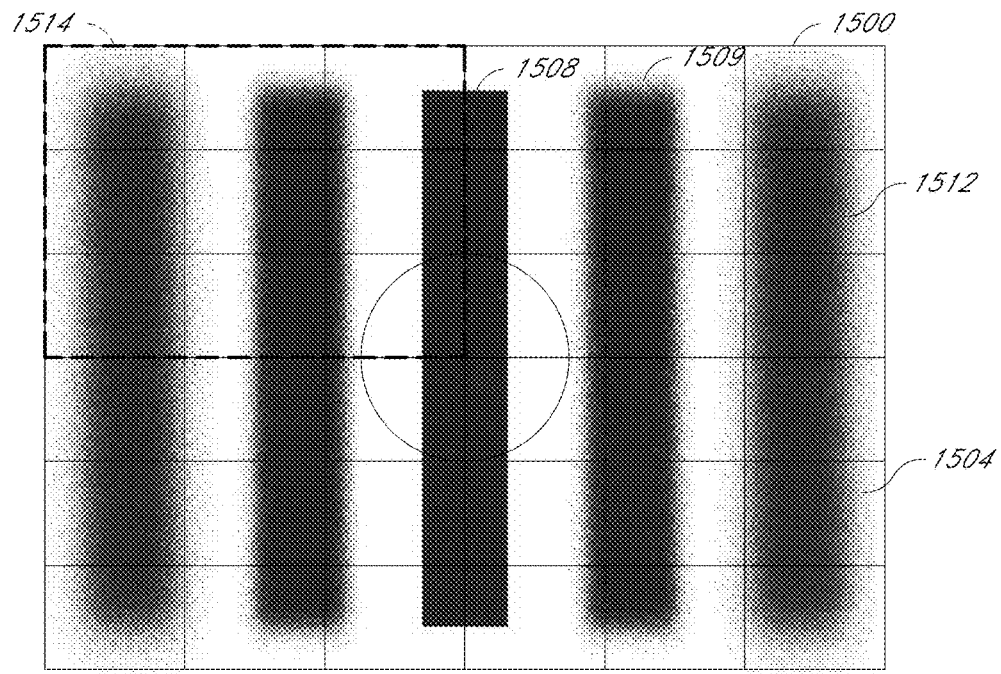
FIGS. 16A-16B show another example display having integrated focus assist and magnification functionality.
Figure 16B:
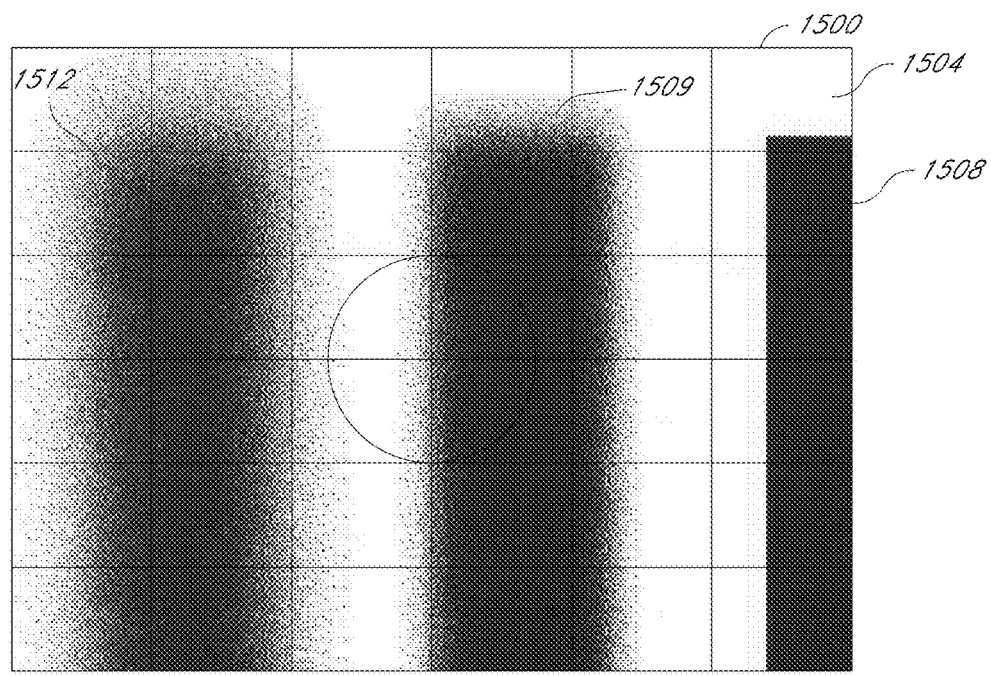
Figure 17A:
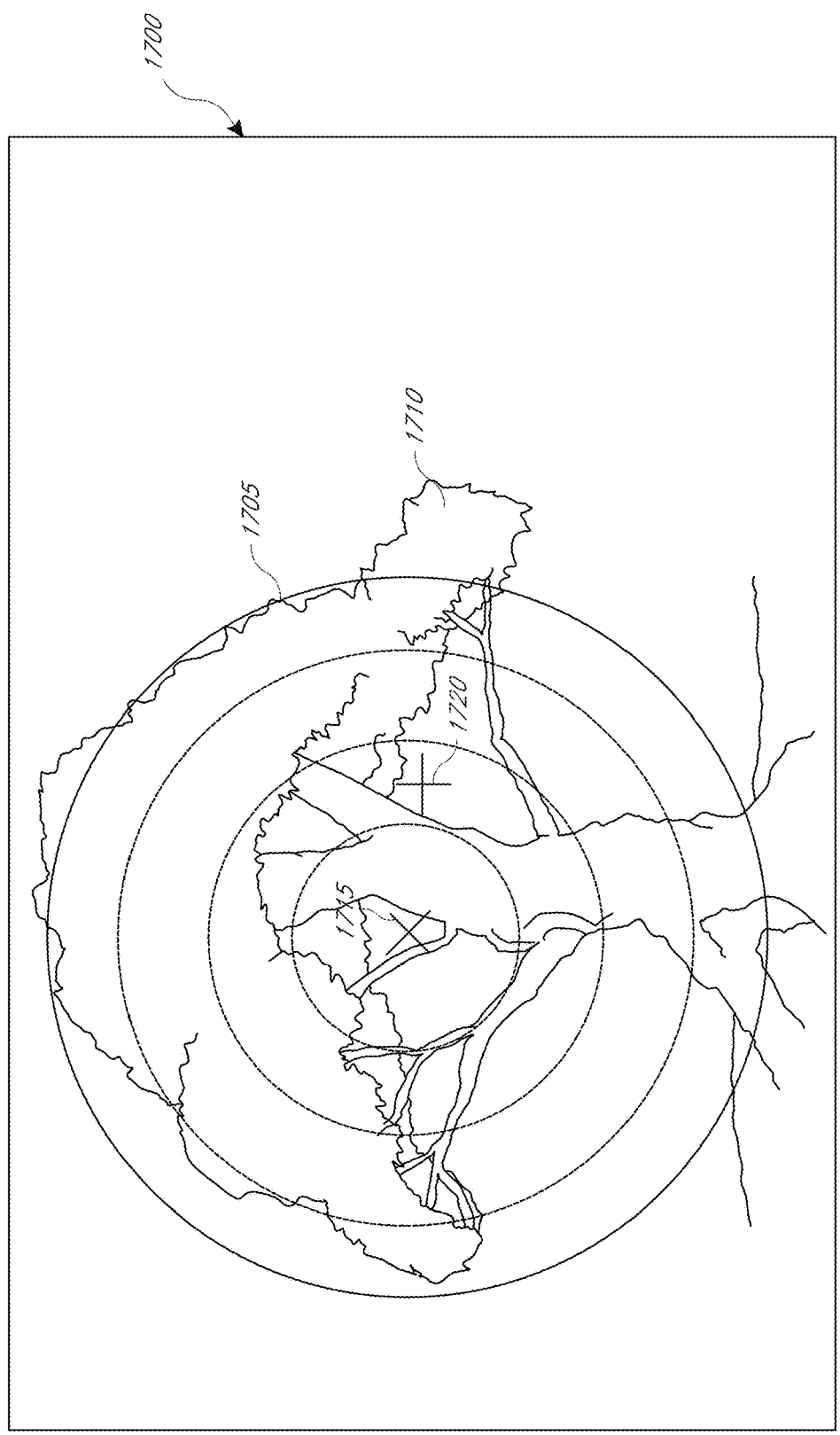
FIGS. 17A-B show an example display having integrated focus assist that includes an indicator that changes size according to a level of focus.
Figure 17B:
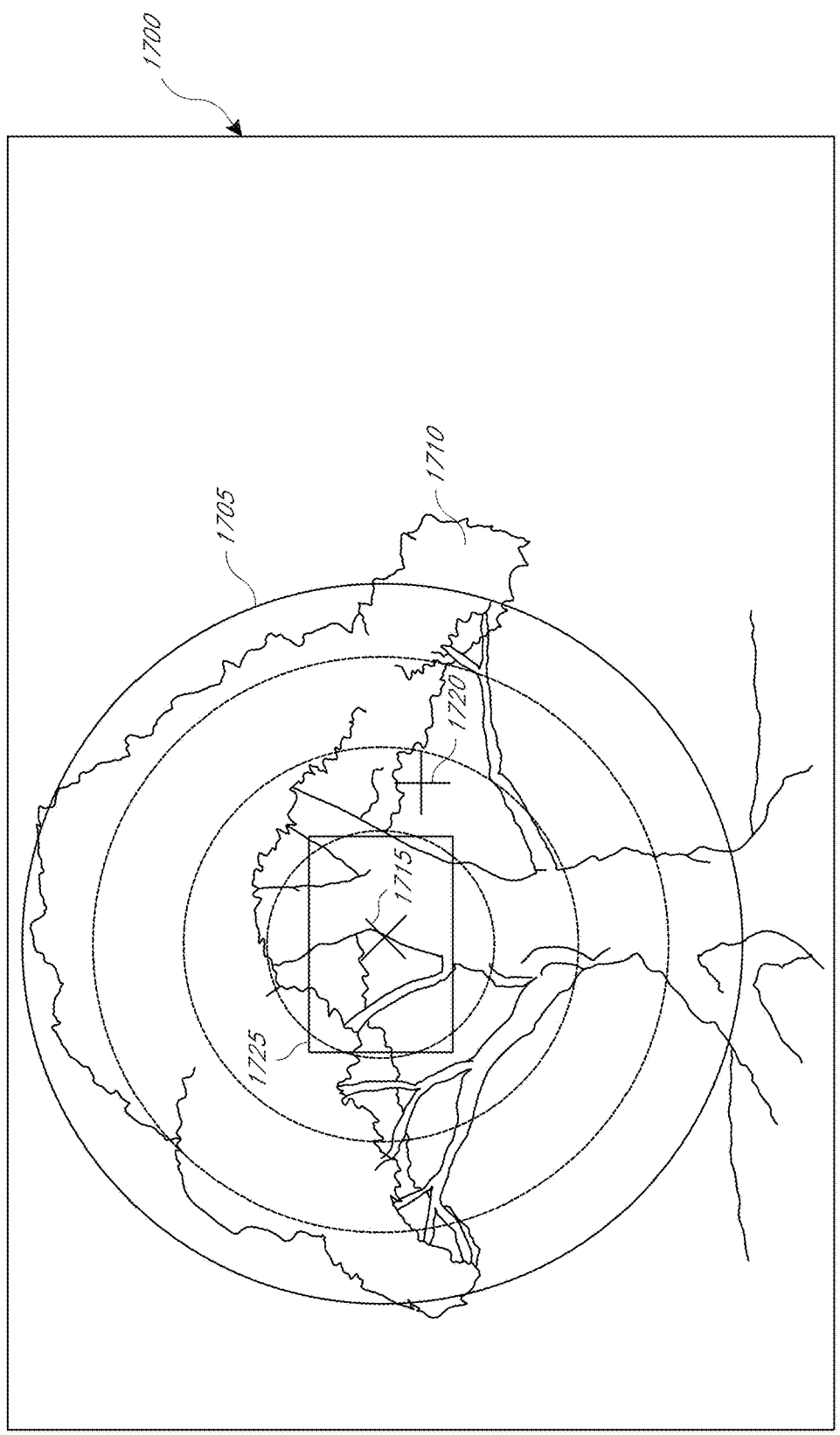
Figure 18:
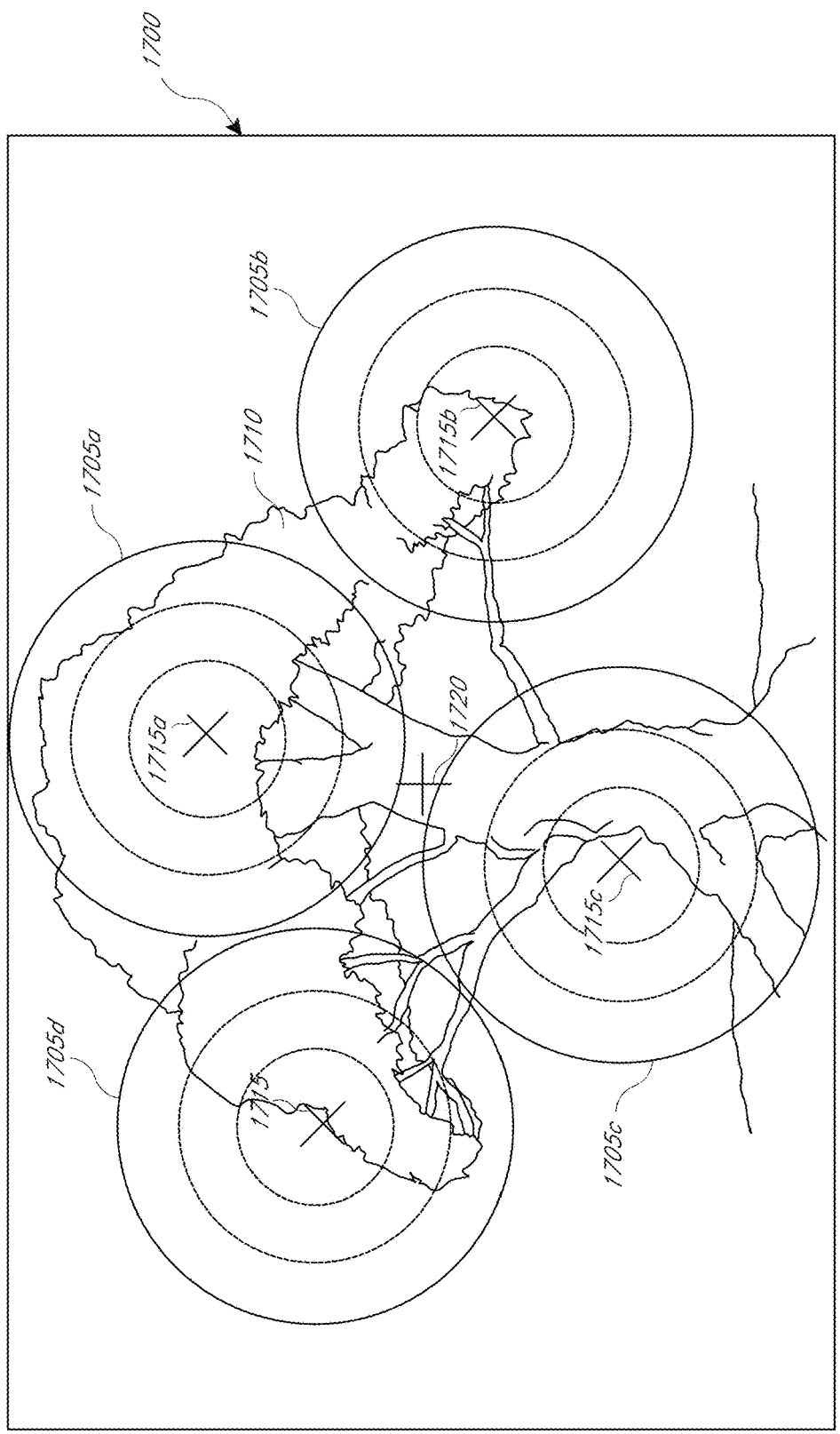
FIG. 18 shows an example display having integrated focus assist that includes a plurality of indicators that change size according to levels of focus at a plurality of points.

In general, the display can present the focus assist information according to any of the techniques described herein including, without limitation, horizontal line graphs (FIGS. 1, 3, 15A-B), vertical line graphs (FIG. 2), with highlights around objects conveying focus information (FIG. 5), combined horizontal and vertical graphs (FIG. 10), multi-line graphs (FIGS. 3 and 14), geometrical shapes having a size, color, and/or shape conveying focus information (FIGS. 17A-B, 18). FIGS. 16A-16B show an example display 1600 having integrated focus assist and zoom functionality, where a grid 1602 is overlaid on the image 1604 in a manner somewhat similar to FIG. 4. As such, the grid 1602 may or may not be visible to the user, but the grid regions 1606 in one embodiment each indicate a focus level. As discussed above with respect to FIG. 4, in one instance the system tints the individual regions 1060 according to the calculated level of focus. For example, poorly focused areas have a first color and well-focused areas have a second color. Regions 606 having intermediate focus levels may in turn carry a tint between the first and second colors along the color spectrum, and corresponding to the respective focus levels.

FIG. 17A shows an example display 1700 having focus assist capability that includes an indicator 1705 that changes size, shape, and/or color corresponding to a level of focus. The display 1700 can visually correlate the indicator 1705 with the level of focus for an image. For instance, the indicator 1705 superimposed over an image on the display 1700 can provide visual feedback to a user. The user can use the visual feedback to confirm that an auto-focus system is satisfactorily focused or to aid in the process of manually focusing an image. Superimposing the indicator 1705 over an image on the display 1700 has the advantage that the user can concentrate on the objects in the viewfinder to glean focus level data. This can be highly intuitive in that the user can easily interpret the display 1700 to determine the relative focus levels of desired portions of the displayed image, such as portions including an object 1710 in the display 1700.

The display 1700 conveys focus level data at least in part through indicator 1705 wherein the focus level data has been calculated using any of the algorithms provided herein, or according to some other appropriate algorithm. For example, the focus level algorithm can include edge detection algorithms such as those using gradient operators or second-order derivatives, boundary extraction using edge detection algorithms, blurred image comparison using a Gaussian or quick box blur approximation, or any combination of these.

In some embodiments, the focus level algorithm calculates the focus level for a subset of an entire image. The subset can be defined by a geometric area, a pattern of pixels, a scan line, multiple scan lines, or any combination of these. In some embodiments, an apparatus having display 1700 is configured to provide a way for the user to define a focus region. The display 1700 can be responsive to user input to select a focus region. In some embodiments, the display 1700 can include a touch screen interface allowing the user to select the focus region. The user can touch a portion of the image to select the region or can use other gestures or methods to define, zoom in on, or zoom out on, a region. Other types of interfaces can be used instead of or in addition to touch screens, including, but not limited to, joysticks, keypads, and the like. The focus region can be manipulated using methods similar to the manipulation of a magnified image as described herein with reference to FIGS. 15A-C.

The size of indicator 1705 can change corresponding to a change in the level of focus of a focus region. In some embodiments, the indicator 1705 can be a shape that decreases in size as the level of focus increases. For example, the indicator 1705 can be a circle that has a predefined radius when an object is out of focus, indicated by the solid circle in FIG. 17A. As the level of focus increases, the radius of the circle can decrease, indicated by the dotted circles in FIG. 17A. The visual effect of the indicator 1705 changing size can provide intuitive feedback to the user such that the user can relatively quickly surmise the level of focus in the focus region. In some embodiments, the indicator 1705 can have a maximum and minimum size such that when the level of focus reaches a certain level the indicator 1705 no longer responds to changes in the level of focus. The minimum size can correspond to a maximum level of focus or to some other threshold level of focus. In some embodiments, the size of the indicator 1705 increases with increasing level of focus. The change in size of the indicator 1705 can be continuous or substantially continuous, such that the size gradually changes as a function of the level of focus, or can be discrete, such that changes in size are in discrete increments, where a transition to a particular increment indicates that the current level of focus has passed corresponding threshold. In some embodiments, changes from one size to the next are discrete, but are close enough to one another to appear continuous to the human eye.

The color of indicator 1705 can change in a fashion similar to the size. In some embodiments, the color of indicator 1705 changes from red to green to indicate a change from a low level of focus to a high level of focus. The change in color can be correlated with the size of indicator 1705. For example, the indicator 1705 can be a square that decreases in size and changes color from red to green as the level of focus increases. Similar to the change in size, the change in color can be a smooth transition along a spectrum of colors, or can be in discrete steps indicating that the current focus level has passed corresponding thresholds. For example, the color can be red when the level of focus is less than a defined lower threshold, and green when it is above a defined higher threshold. If there is a gap between the lower threshold and higher threshold, the indicator 1705 can be a third color, such as yellow. The colors can be different from those described above and may be able to be set by the user.

The shape of indicator 1705 can change with the level of focus. The shape of the indicator 1705 can include, for example, polygons (e.g., squares, rectangles, triangles, etc.), curved geometric shapes (e.g., circles, ovals, ellipses, etc.), irregular shapes, cross-hairs, a reticle, an asterisk, parallel lines, perpendicular lines, multiple lines, or any combination of these. For example, the indicator 1705 can be an irregular shape that corresponds to the focus region having a low level of focus. As the level of focus increases the irregular shape can transform into a regular shape, such as a circle, indicating that the focus region has reached a predefined level of focus. As another example, the indicator 1705 can be the shape of a cross when the focus region has a low level of focus and change into a square when the focus region has a high level of focus. Similar to the size and color of the indicator 1705, the shape can change can be substantially continuous or discrete. The size, shape, and/or color of indicator 1705 can change in any combination as described herein to convey to the user a level of focus in such a way as to provide feedback that is intuitive and makes it relatively easy to quickly ascertain focus levels.

The display 1700 can include a focus region(s) indicator 1715. The focus region indicator 1715 can be a visual feature on the display 1700 that marks the region(s) for which focus level information is being displayed. The focus region indicator 1715 can be one or more lines, a shape correlated with the size of the focus region, or some other visual feature capable of indicating a focus region. The focus region(s) indicator 1715 can be configured to be stationary relative to the display 1700 or to follow the selected region of interest as the object 1710 moves and/or the camera moves. As shown, the indicator 1715 can be centered, or substantially centered, on the focus region(s). In another embodiment, an arrow or other indicator points to or otherwise identifies the current focus region(s).

The display 1700 can include visual features configured to aid the user in composing an image. In some embodiments, a marker 1720 can indicate the center of the image. The marker 1720 can assist the user in identifying where to line up a desired object, such as object 1710. Other visual features can be used such as, for example, a grid pattern, vertical lines, horizontal lines, diagonal lines, geometric shapes, or any combination of these.

FIG. 17B shows the display 1700 as described above with reference to FIG. 17A where the display includes a focus region and level indicator 1725 that indicates a focus region and a level of focus. The focus region and level indicator 1725 can be configured to have a fixed size and shape that corresponds to a defined focus region. The focus region can have a different size and shape from the focus region and level indicator 1725. In some embodiments, the focus region and level indicator 1725 is a rectangle that is centered on the focus region, as indicated by focus region indicator 1715. In some embodiments, the focus region indicator 1715 is not included.

The focus region and level indicator 1725 can change color corresponding with a level of focus in the focus region. As described above, the color can change according the focus levels in discrete steps or in a substantially smooth fashion. In some embodiments, the indicator 1705 has a fixed color and the focus region and level indicator 1725 changes color. In some embodiments, both the indicator 1705 and the focus region and level indicator 1725 change color. The colors of the indicators 1705, 1725 can be correlated.

As an example, the user may desire to capture an image of an object 1710, but to only focus on a particular portion of the object. The display can visually correlate indicator 1705 with the focus region by centering the indicator 1705, which is a circle, on that region. The display can also display focus region and level indicator 1725 to indicate the size and shape of the focus region to the user. As the region becomes more focused, the radius of indicator 1705 gets smaller and the color of focus region and/or level indicator 1725 changes. Upon reaching a threshold level of focus, the indicator 1705 reaches a minimum size and the focus region and level indicator 1725 becomes a predefined color, such as green. The user can then quickly surmise that the focus region is focused. For instance, even though the indicator 1705 may be relatively small at a high focus level, the focus region and level indicator 1725 provides additional confirmation that the region is in focus. In some embodiments, the size of indicator 1705 changes in discrete steps corresponding to different focus levels. For example, the indicator 1705 can have a first size corresponding to a first focus level, a second size corresponding to a second focus level, and a third size corresponding to a third focus level where the first, second, and third sizes are configured to be distinguishably different when displayed. Some embodiments provide for a different number of discrete sizes corresponding to defined focus levels including, without limitation, two discrete sizes, four discrete sizes, five discrete sizes, and so on.

FIG. 18 shows an example display 1700 having integrated focus assist that includes a plurality of indicators 1705*a-d* that change size, shape, and/or color corresponding to levels of focus at a plurality of focus regions. The indicators 1705*a-d* can be correlated with the focus regions such that the position of the indicators 1705*a-d* on the display 1700 can correspond to their focus region. The indicators 1705*a-d* can change size, shape, and/or color as described more fully with reference to indicator 1705 in FIG. 17A. The indicators 1705*a-d* can be independent from one another, individually indicating a level of focus of their corresponding focus region. The size, shape, and/or color of indicators 1705*a-d* can be different from one another or uniform across the display. The plurality of focus regions can be automatically selected, manually selected by a user using suitable techniques as described herein, and/or combining user input with automatic region selection. In some embodiments, the plurality of regions correspond to regions selected for magnification, as described more fully with reference to FIGS. 15A-C and 16A-B. The plurality of regions can be magnified and indicators 1705 and/or focus region and level indicator 1725 can be included when the plurality of regions are displayed.

Figure 19:
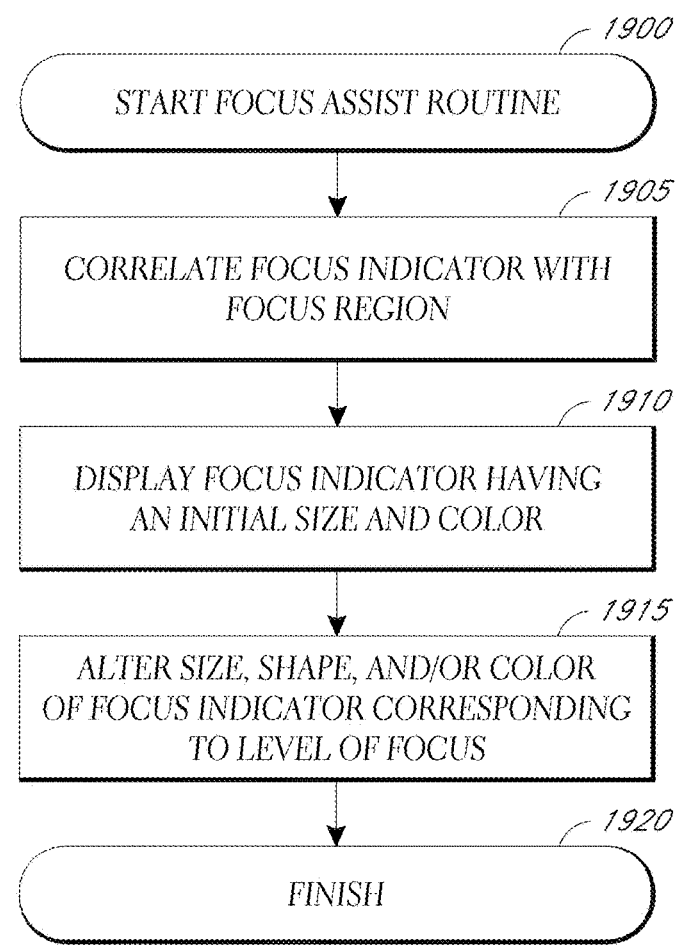
FIG. 19 shows a flow chart of an example method of indicating a level of focus on a display.

FIG. 19 shows a flow chart of an example method of indicating a level of focus on a display. For ease of description, the method will be described as being performed by the display. However, the method can be performed by the display, a camera, an apparatus attached to a display, one or more processors coupled to a display, a computer, a smartphone, or the like.

In block 1905, the display correlates an indicator with a focus region. The focus region can be selected by the user, automatically, or some combination of these. Correlating an indicator with a focus region can include determining the center of the focus region and the center of the indicator and aligning these two centers. One or more focus regions can be defined and the display can repeat this step for each focus region. In some embodiments, the one or more focus regions correspond to magnified regions as described herein with reference to FIGS. 15A-C and 16A-B. Selecting a focus region can include designating a region to magnify on the display.

In block 1910, the display can show the indicator having an initial size, shape, and/or color. The initial characteristics of the indicator can reflect the initial level of focus in the region of interest. The level of focus can be determined using any of the algorithms provided herein, or according to some other appropriate algorithm. The display can correlate the level of focus with a size, shape, and/or color of the indicator. For example, the display can show a red circle with a relatively large radius corresponding to a focus region that is initially out of focus. As another example, the display can show a relatively small green square corresponding to a focus region that is initially in focus. This step can be repeated by the display for each focus region defined.

In block 1915, the display can alter the size, shape, and/or color of the indicator corresponding to changes in the level of focus. In some embodiments, if the user manually changes the focus of the apparatus, the display determines the new focus level using an appropriate algorithm. In some embodiments, the focus is changed automatically rather than manually. If the level of focus changes in a focus region, the corresponding indicator can change in size, shape, and/or color. For example, if the level of focus increases, the indicator can decrease in size. As another example, if the level of focus increases, the indicator can decrease in size and change color. As another example, if the level of focus increases the indicator can change both shape and color. As described above, the size, shape, and/or color can change substantially continuously or discretely in response to changes in focus levels. This step can be repeated by the display for each focus region defined.

Conclusion

It should be understood that the embodiments described herein may be implemented in a variety of ways. Other embodiments that are apparent to those of ordinary skill in the art, including embodiments which do not provide all of the benefits and features set forth herein, are also within the scope of this invention. For example, the camera could interface with a physically separate image processing device, such as a computer, or the image processing capabilities could be implemented within the camera. Further, algorithms may be implemented in a variety of ways, such as in hardware, software, or a combination of hardware and software. While some of the embodiments described herein provide specific details for implementation, the scope of the disclosure is intended to be broad and not limited to the specific embodiments described. Accordingly, details described in the specification should not be construed as limitations of the claimed invention. Rather, the scope of the claims should be ascertained from the language of the claims.

What is claimed is:

1. An apparatus that assists in adjusting a focus of an image, the apparatus comprising:
    an image sensor configured to detect an image; and
    one or more processors programmed to:
        determine that a focus of a focus region of an image is at a first focus level;
        generate a first visual indication of the first focus level;
        generate a second visual indication of the first focus level, the second visual indication being different in shape than the first visual indication;
        generate a graphical representation of the image;
        output, for presentation on a display, the graphical representation together with the first visual indication and the second visual indication so that the first visual indication and the second visual indication are overlaid on the graphical representation and positions of the first visual indication and the second visual indication on the graphical representation depend on a location of the focus region within the image;
        detect a first user adjustment of the focus of the focus region from the first focus level to a second focus level subsequent to the output of the graphical representation together with the first visual indication and the second visual indication; and
        in response detecting the first user adjustment,
            change the first visual indication from a first color to a second color different from the first color to visually indicate that the focus of the focus region is at the second focus level rather than at the first focus level, and
            change the second visual indication to visually indicate that the focus of the focus region is at the second focus level rather than at the first focus level.

2. The apparatus of claim 1, wherein the image comprises the focus region and a non-focus region different from the focus region, and at least part of a graphical representation of the focus region is within an interior area defined by the first visual indication.

3. The apparatus of claim 2, wherein the interior area is rectangular.

4. The apparatus of claim 1, wherein the one or more processors is programmed to change of the second visual indication by making one or more intermediate adjustments to the second visual indication corresponding to one or more intermediate focus levels between the first focus level and the second focus level.

5. The apparatus of claim 1, wherein the second focus level is more in focus than the first focus level, and the one or more processors is programmed to change the second visual indication by converging points on the second visual indication with respect to other points on the second visual indication to visually convey an increase in the focus of the focus region.

6. The apparatus of claim 1, wherein the one or more processors is programmed to change the second visual indication by changing a shape of the second visual indication.

7. The apparatus of claim 1, wherein the one or more processors is programmed to change the first and second visual indications in real time with the first user adjustment.

8. The apparatus of claim 1, wherein the second focus level is more in focus than the first focus level, and the second color is green.

9. The apparatus of claim 1, wherein the second visual indication comprises a polygon.

10. The apparatus of claim 1, wherein the second visual indication comprises a plurality of triangles.

11. The apparatus of claim 1, wherein the one or more processors is programmed to determine the focus of the focus region in response to a user selection of the focus region received via a user interface.

12. The apparatus of claim 1, further comprising a camera housing and the display, the camera housing being configured to support the image sensor, the one or more processors, and the display.

13. The apparatus of claim 1, wherein the one or more processors is further programmed to:
   detect a second user adjustment of the focus of the focus region from the second focus level to the first focus level subsequent to detecting the first user adjustment; and
   in response to detecting the second user adjustment,
      change the first visual indication from the second color to the first color to visually indicate that the focus of the focus region is at the first focus level rather than at the second focus level, and
      change the second visual indication to visually indicate that the focus of the focus region is at the first focus level rather than at the second focus level.

14. A method on assisting in adjusting a focus of an image, comprising:
   detecting an image with an image sensor;
   determining that a focus of a focus region of the image is at a first focus level;
   generating a first visual indication of the first focus level;
   generating a second visual indication of the first focus level, the second visual indication being different in shape than the first visual indication;
   generating a graphical representation of the image;
   outputting, for presentation on a display, the graphical representation together with the first visual indication and the second visual indication so that the first visual indication and the second visual indication are overlaid on the graphical representation and positions of the first visual indication and the second visual indication on the graphical representation depend on a location of the focus region within the image;
   detecting a first user adjustment of the focus of the focus region from the first focus level to a second focus level subsequent to said outputting the graphical representation together with the first visual indication and the second visual indication; and
   in response said detecting the first user adjustment,
      changing the first visual indication from a first color to a second color different from the first color to visually indicate that the focus of the focus region is at the second focus level rather than at the first focus level, and
      changing the second visual indication to visually indicate that the focus of the focus region is at the second focus level rather than at the first focus level.

15. The method of claim 14, wherein the image comprises the focus region and a non-focus region different from the focus region, and at least part of a graphical representation of the focus region is within an interior area defined by the first visual indication.

16. The method of claim 14, wherein said changing the second visual indication comprises making one or more intermediate adjustments to the second visual indication corresponding to one or more intermediate focus levels between the first focus level and the second focus level.

17. The method of claim 14, wherein the second focus level is more in focus than the first focus level, and said changing the second visual indication comprises converging points on the second visual indication with respect to other points on the second visual indication to visually convey an increase in the focus of the focus region.

18. The method of claim 14, wherein the second focus level is more in focus than the first focus level, and the second color is green.

19. The method of claim 14, wherein the second visual indication comprises a plurality of triangles.

20. The method of claim 14, further comprising:
   detecting a second user adjustment of the focus of the focus region from the second focus level to the first focus level subsequent to said detecting the first user adjustment; and
   in response to said detecting the second user adjustment,
      changing the first visual indication from the second color to the first color to visually indicate that the focus of the focus region is at the first focus level rather than at the second focus level, and
      changing the second visual indication to visually indicate that the focus of the focus region is at the first focus level rather than at the second focus level.

* * * * *